United States Patent
Guo

(10) Patent No.: US 7,317,931 B2
(45) Date of Patent: Jan. 8, 2008

(54) TRANSMISSION RATE CHANGES IN COMMUNICATIONS NETWORKS

(75) Inventor: Yingjie Jay Guo, Flackwell Heath (GB)

(73) Assignee: Fujitsu limited, Kawasaki (JP)

( * ) Notice: Subject to any disclaimer, the term of this patent is extended or adjusted under 35 U.S.C. 154(b) by 470 days.

(21) Appl. No.: 10/276,890

(22) PCT Filed: Apr. 18, 2001

(86) PCT No.: PCT/GB01/01762

§ 371 (c)(1),
(2), (4) Date: Nov. 19, 2002

(87) PCT Pub. No.: WO01/89097

PCT Pub. Date: Nov. 22, 2001

(65) Prior Publication Data

US 2004/0087327 A1    May 6, 2004

(30) Foreign Application Priority Data

May 19, 2000    (GB) ................................. 0012258.0

(51) Int. Cl.
*H04M 1/00*    (2006.01)
(52) U.S. Cl. .................... 455/522; 455/523; 455/39
(58) Field of Classification Search ................ 455/561, 455/522; 370/18
See application file for complete search history.

(56) References Cited

U.S. PATENT DOCUMENTS

| | | | |
|---|---|---|---|
| 5,056,109 A * | 10/1991 | Gilhousen et al. .......... | 370/342 |
| 5,070,536 A | 12/1991 | Mahany et al. | |
| 6,061,427 A | 5/2000 | Ryoo | |
| 6,223,056 B1 * | 4/2001 | Appel ........................ | 455/561 |
| 6,304,593 B1 * | 10/2001 | Alouini et al. .............. | 375/216 |
| 6,329,833 B1 * | 12/2001 | Wu ............................. | 324/765 |

(Continued)

FOREIGN PATENT DOCUMENTS

WO    97/18643    5/1997

(Continued)

OTHER PUBLICATIONS

Adaptive Rate and Power DS/CDMA Communications in Fading Channels, Sang Wu Kim; IEEE Communications Letter, vol. 3, No. 4, Apr. 1999: XP-000830868, pp. 85-87.

*Primary Examiner*—Lester G. Kincaid
*Assistant Examiner*—Fred Casca
(74) *Attorney, Agent, or Firm*—Katten Muchin Rosenman LLP

(57) ABSTRACT

A communications network including first and second stations, the first station comprising a transmitter and the second station comprising a receiver. The network further including a transition control portion which is operable, prior to a change in a transmission rate of a preselected signal from the first station to the second station, to cause transitional signals to be transmitted from the first station to the second station over the course of a transitional period expiring before the change is effected. The power levels of the transitional signals are varied over the course of the period in such a way as to reduce a level of instability in the network. In another embodiment probing signals are transmitted prior to making such a rate change to probe a likely relationship between the transmission rate and transmission power after the change is effected.

21 Claims, 19 Drawing Sheets

U.S. PATENT DOCUMENTS 6,611,676 B2 * 8/2003 Ue et al. ................. 455/69
6,618,596 B1 * 9/2003 Uchida ................. 455/522
6,628,956 B2 * 9/2003 Bark et al. ............. 455/522
6,646,510 B2 * 11/2003 Julien et al. ........... 330/284
6,766,156 B1 * 7/2004 Hayashihara ........... 455/295

FOREIGN PATENT DOCUMENTS

| WO | 99/01944 | | 1/1999 | |
|---|---|---|---|---|
| WO | WO 99/01944 | * | 1/1999 | ............. 370/18 |
| WO | 00/14908 | | 3/2000 | |

* cited by examiner

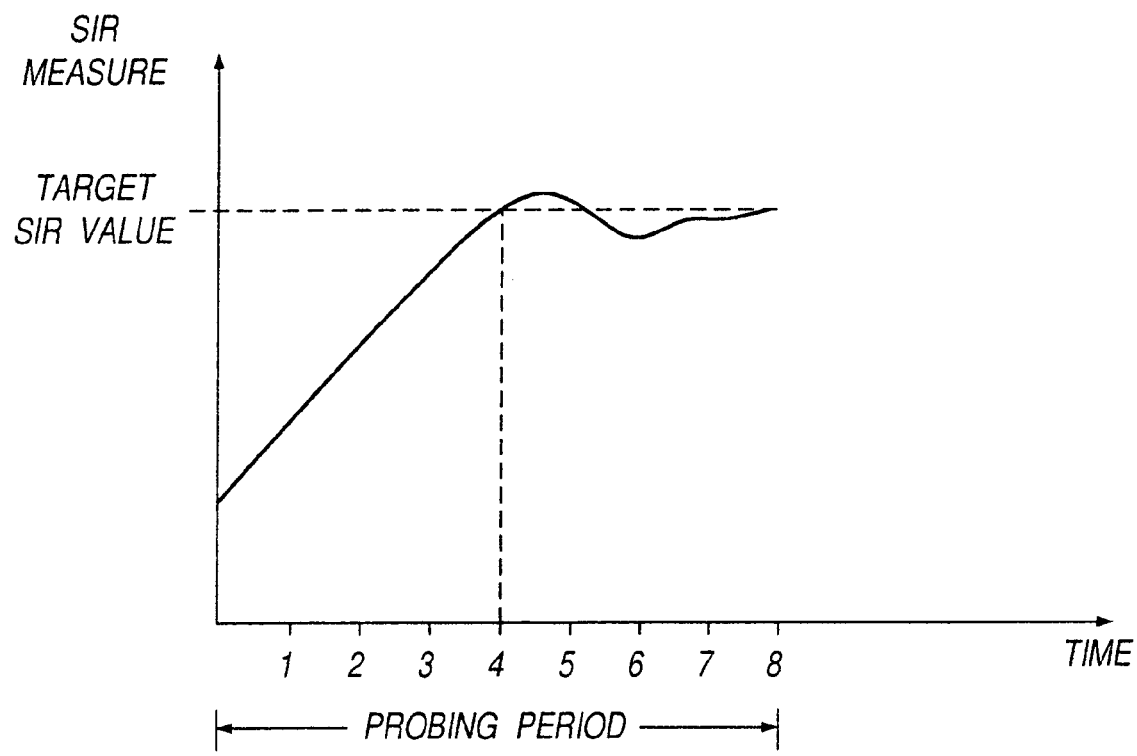
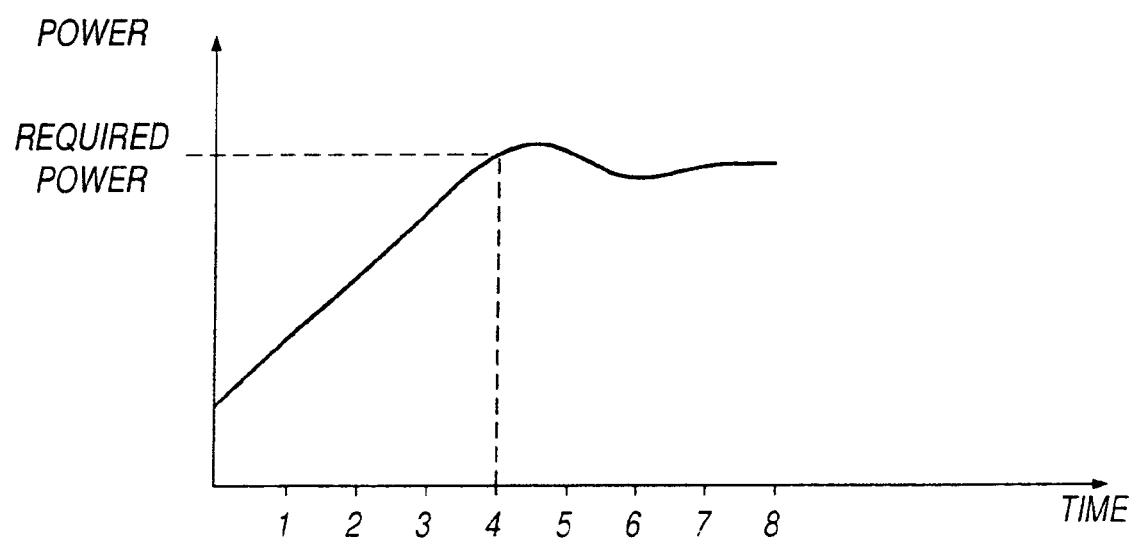
Fig.17

TRANSMISSION RATE CHANGES IN COMMUNICATIONS NETWORKS

BACKGROUND OF THE INVENTION

1. Field of the Invention

The present invention relates to transmission rate changes in communications networks, for example mobile communications networks such as Wideband Code Division Multiple Access (W-CDMA) cellular networks.

2. Description of the Related Art

FIG. 1 of the accompanying drawings shows parts of a mobile communications network including user equipment UE which is in two-way communication with a base station BS. The base station BS may also be referred to as a node-B. The user equipment UE and base station BS have one or more uplink (or reverse link) channels for transmitting signals (user data and/or control signals) from the user equipment to the base station, and one or more downlink (or forward link) channels for transmitting signals (user data and/or control signals) from the base station to the user equipment. There may be separate data and control channels in one or both directions. In a cellular mobile communication system, a wide coverage area is provided by providing several base stations, each base station having a coverage area that partly overlaps with that of a neighbouring base station, so that at certain times a UE may be capable of receiving signals from two or more base stations.

The base station BS is also in two-way communication with a base station controller BSC of the network. The base station controller may also be referred to as a radio network controller (RNC). Usually, several base stations are in communication with the same base station controller. The base station controller BSC is in turn in two-way communication with a mobile switching centre MSC. The base station controller BSC serves to manage the radio resources of its connected base stations, for example by performing hand-off and allocating radio channels. The mobile switching centre MSC serves to provide switching functions and coordinates location registration and call delivery.

One W-CDMA mobile communications network currently under development by the $3^{rd}$ Generation Partnership Project (3GPP) is referred to as a UTRA network. UTRA stands for UMTS Terrestrial Radio Access, and UMTS stands for Universal Mobile Telecommunication System (a third generation mobile telecommunications system). The proposed UTRA network is a Direct Sequence CDMA (DS-CDMA) network using frequency division duplexing (FDD). In such a FDD network, uplink and downlink channels are realised using different frequencies (spaced by 130 MHz), and a physical channel is identified by a code and a frequency.

The UTRA network is being developed to meet the growing demand for the use of wireless access for multimedia applications which demand much higher bandwidth than was previously necessary for low data rate applications such as voice data transmission. Such third-generation systems should typically be able to offer transmission rates of at least 144 kb/s (preferably 384 kb/s) for high-mobility users with wide-area coverage and 2 Mb/s for low-mobility users with local coverage. The data may be sent in the form of packets.

In addition to applications calling for high transmission rates, there will be a demand for the capability to use multiple services simultaneously so that, for example, a user could browse the Internet while receiving a file from a corporate Intranet server as a background process.

Since in a W-CDMA mobile communications network multiple radio channels can share the same frequency band, careful control of transmission power must be maintained to minimise interference problems. The problem of interference will inevitably increase not only as the number of users increases, but also as the use of high data rate services such as those mentioned above increases.

Power-efficient use of the available spectrum is facilitated in W-CDMA by the use of closed-loop power control techniques on certain channels. With such techniques, the transmission power used at a transmission site is controlled, based for example on the quality of the signal received at a reception site, so as to adjust the transmission power to the minimum level required to maintain an acceptable quality of service (QoS) at the reception site. For example, if the bit error rate of signals received on a particular channel by a UE from a BS is too high (due perhaps to a rise in the overall interference level in the network) for an acceptable quality of service, the UE would send power control commands to the BS which would cause the BS to increase its transmission power for that channel in an attempt to restore the quality of service.

Generally speaking, the use of a higher transmission rate leads to a greater chance of reception errors since the data bits contained within the signal are more closely spaced and are therefore more susceptible to interference and noise. A higher transmission rate therefore typically requires a greater transmission power to be used in order to overcome the increase in error rate.

As a result of this, when a high data rate service is introduced into the network at the demand of a particular user, the higher transmission power required for this service can lead to a significant and sudden increase in the overall network interference. The closed-loop power control mechanisms in use by other users in the locality tend to react by causing those users in turn to increase their own transmission power, or to request a power increase from their signal provider, in order to maintain the required relevant quality of service. This process is usually non-linear and it may take a considerable amount of time for the network to restore balance following the introduction of such a high data rate service transmission.

Ideally, for each packet transmission in a high data rate channel, the transmission site should use the highest achievable data rate and the minimum transmit power, so that the channel throughput is high, the delay is short and the interference caused to the network is low. Unfortunately, these objectives are very difficult to achieve in practice, primarily due to the following reasons.

Firstly, as mentioned above, high data rate transmissions need high transmit powers. Since certain quality of service must be maintained in all the radio channels, increasing the transmit power for one UE will lead to the increase of transmit powers for many other channels and even other cells.

Secondly, the channel conditions at the UE are very difficult for the BTS to estimate accurately in a timely manner. The channel conditions include the inter-cell interference level, the delay profile and the fading condition of the multipaths. Therefore, the BTS cannot predict accurately the required power level for a chosen data rate to achieve a certain block error rate (BLER) at the UE.

These problems are exacerbated when a substantial increase in the transmission power is needed, such as when starting a very high data rate (e.g. 2 Mb/s) service.

Accordingly, it is desirable to provide a mobile communications network in which the above-mentioned problems are eliminated.

SUMMARY OF THE INVENTION

According to a first aspect of the present invention, there is provided a communications network including first and second stations, the said first station comprising a transmitter and the said second station comprising a receiver, the network comprising: transition control means operable, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in such a way as to reduce a level of instability in the network that would otherwise result from a transmission power change required by said change in transmission rate of that signal.

According to a second aspect of the present invention, there is provided a communications network including first and second stations, the said first station comprising a transmitter and the said second station comprising a receiver, the network comprising: probing means operable, prior to a change in a transmission rate of a preselected signal from said first to said second station, to cause probing signals to be transmitted from said first station to said second station at one or more probing power levels and further operable to measure results of transmission of said probing signals at the said one or more power levels and to employ the measurement results to provide information relating to a likely relationship between a transmission rate of the said predetermined signal and a transmission power thereof when the change is effected.

According to a third aspect of the present invention, there is provided a base station, for use in a mobile communications network, comprising: transition control means operable, prior to a change in a transmission rate of a preselected signal from the base station to a user equipment of the network, to cause transitional signals to be transmitted from the base station to said user equipment over the course of a transitional period expiring before said change is effected, the power levels of said transitional signals being varied over the course of said period in such a way as to reduce a level of instability in the network that would otherwise result from a transmission power change required by said change in transmission rate of that signal.

According to a fourth aspect of the present invention, there is provided a user equipment, for use in a mobile communications network, comprising: transition control means operable, prior to a change in a transmission rate of a preselected signal from the user equipment to a receiving station of the network, to cause transitional signals to be transmitted from the user equipment to said receiving station over the course of a transitional period expiring before said change is effected, the power levels of said transitional signals being varied over the course of said period in such a way as to reduce a level of instability in the network that would otherwise result from a transmission power change required by said change in transmission rate of that signal.

According to a fifth aspect of the present invention, there is provided a communications method for use in a communications network including first and second stations, the said first station comprising a transmitter and the second station comprising a receiver, wherein: prior to a change in a transmission rate of a preselected signal from said first station to said second station, transitional signals are caused to be transmitted from said first station to said second station over the course of a transitional period expiring before said change is effected, the power levels of said transitional signals being varied over the course of said period in such a way as to reduce a level of instability in the network that would otherwise result from a transmission power change required by said change in transmission rate of that signal.

According to a sixth aspect of the present invention, there is provided a base station, for use in a mobile communications network, comprising: probing means operable, prior to a change in a transmission rate of a preselected signal transmitted from the base station to a user equipment of the network, to cause probing signals to be transmitted from the base station to said user equipment at one or more probing power levels.

According to a seventh aspect of the present invention, there is provided a user equipment, for use in a mobile communications network having a transmitting station that is operable, prior to a change in a transmission rate of a preselected signal transmitted from that station to the user equipment, to cause probing signals to be transmitted from said other station to the user equipment at one or more probing power levels, the user equipment comprising: result measurement means for measuring results of transmission of said probing signals at the said one or more power levels; and result employing means arranged for receiving said measurement results and operable to employ the measurement results to provide information relating to a likely relationship between a transmission rate of the said predetermined signal and a transmission power thereof when the change is effected.

According to an eighth aspect of the present invention, there is provided a user equipment, for use in a mobile communications network, comprising: probing means operable, prior to a change in a transmission rate of a preselected signal transmitted from the user equipment to a receiving station of the network, to cause probing signals to be transmitted from the user equipment to said receiving station at one or more probing power levels.

According to a ninth aspect of the present invention, there is provided a base station, for use in a mobile communications network having a user equipment that is operable, prior to a change in a transmission rate of a preselected signal transmitted from said user equipment to the base station, to cause probing signals to be transmitted from said user equipment to the base station at one or more probing power levels, the base station comprising: result measurement means for measuring results of transmission of said probing signals at the said one or more power levels; and result employing means arranged for receiving said measurement results and operable to employ the measurement results to provide information relating to a likely relationship between a transmission rate of the said predetermined signal and a transmission power thereof when the change is effected.

According to a tenth aspect of the present invention, there is provided a communications method for use in a communications network including first and second stations, the first station comprising a transmitter and the second station comprising a receiver, wherein: prior to a change in a transmission rate of a preselected signal from said first to said second station, probing signals are caused to be transmitted from said first station to said second station at one or more probing power levels; results of transmission of said probing signals at the said one or more power levels are measured; and the measurement results are employed to provide information relating to a likely relationship between a transmission rate of the said predetermined signal and a transmission power thereof when the change is effected.

The transmitting station and receiving station mentioned above may either be a base station or a user equipment.

BRIEF DESCRIPTION OF THE DRAWINGS

FIG. 17 shows graphs for illustrating operation of the FIG. 14 network;

DETAILED DESCRIPTION OF THE PREFERRED EMBODIMENTS

Figure 1:
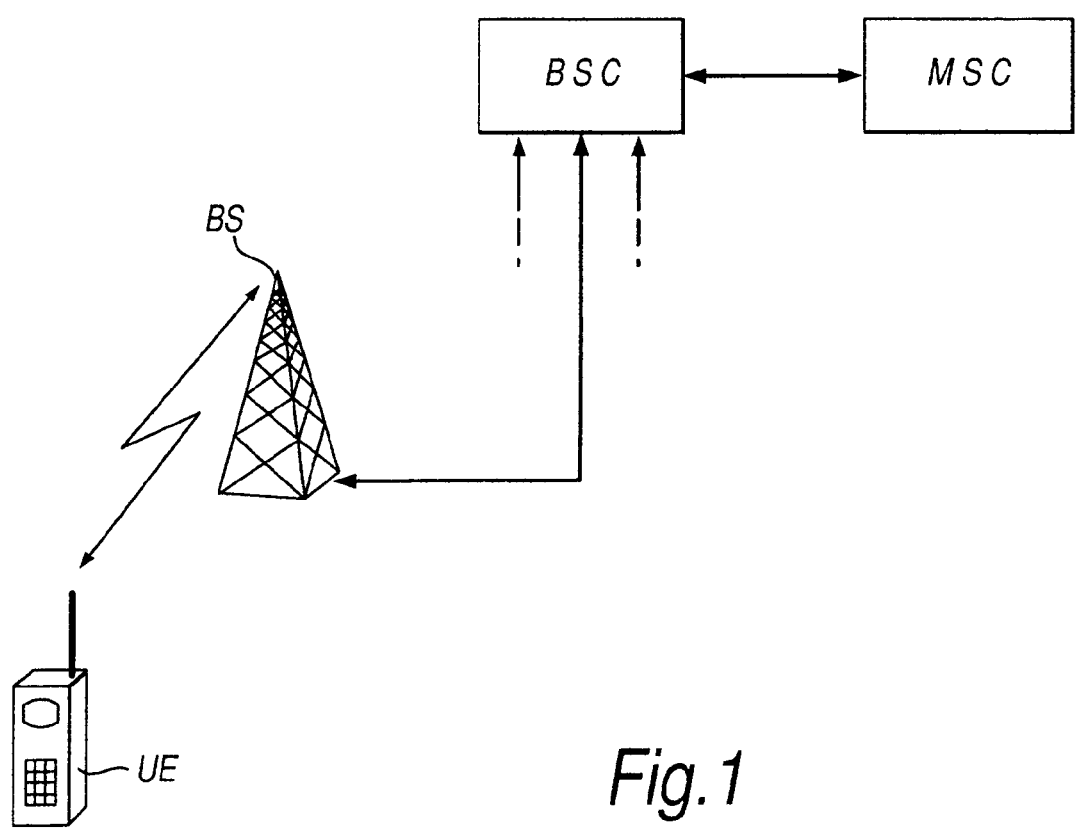
FIG. 1, discussed hereinbefore, shows a schematic view of parts of a mobile communications network.
Figure 2:
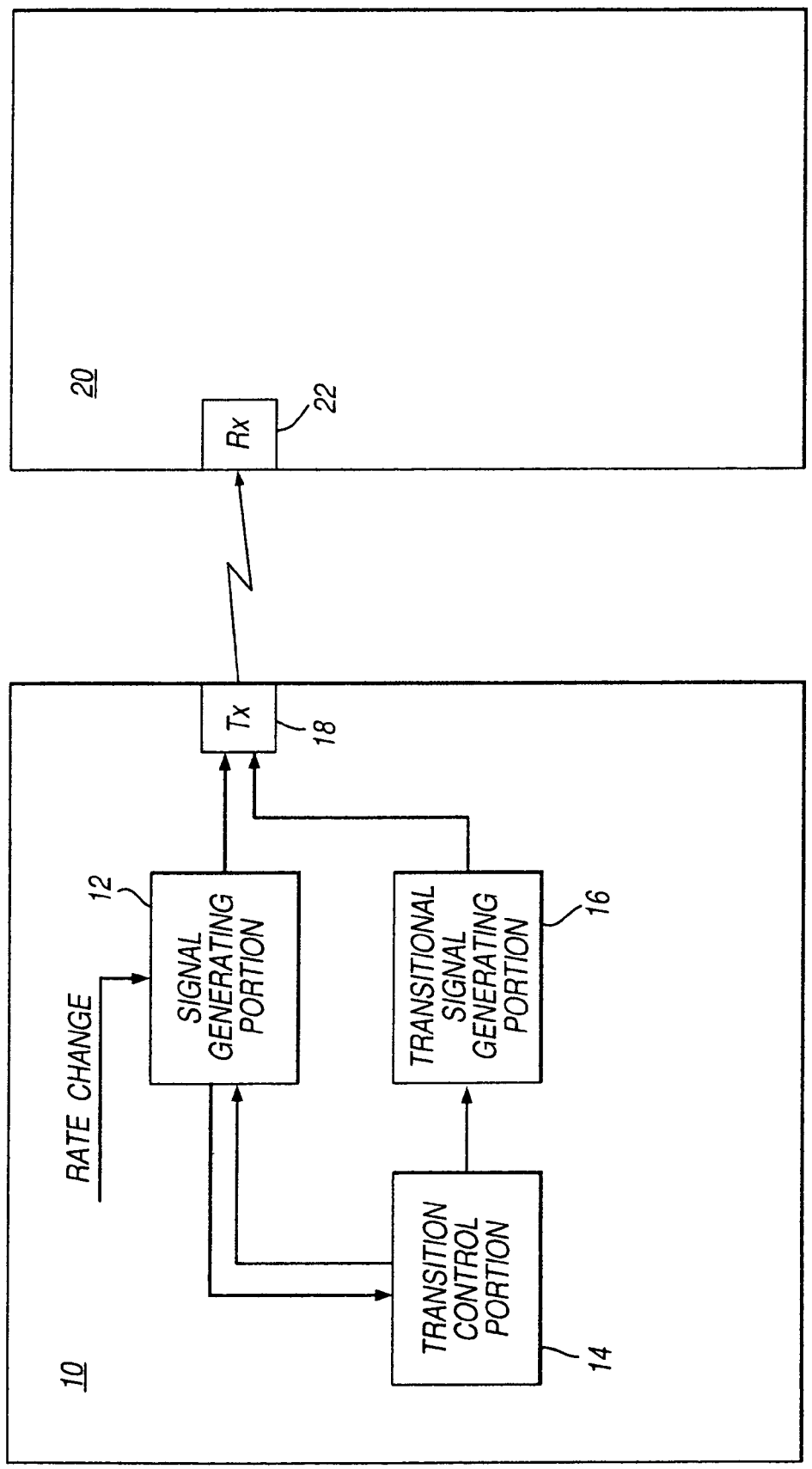
FIG. 2 is a block diagram showing parts of a mobile communications network embodying a first aspect of the present invention.

FIG. 2 is a block diagram showing parts of a mobile communications network embodying the present invention. The mobile communications network includes a base station (BS) 10 in communication with user equipment (UE) 20. The base station 10 comprises a signal generating portion 12, a transition control portion 14, a transitional signal generating portion 16, and a transmitter portion 18. The user equipment 20 includes a receiver portion 22.

Figure 3:
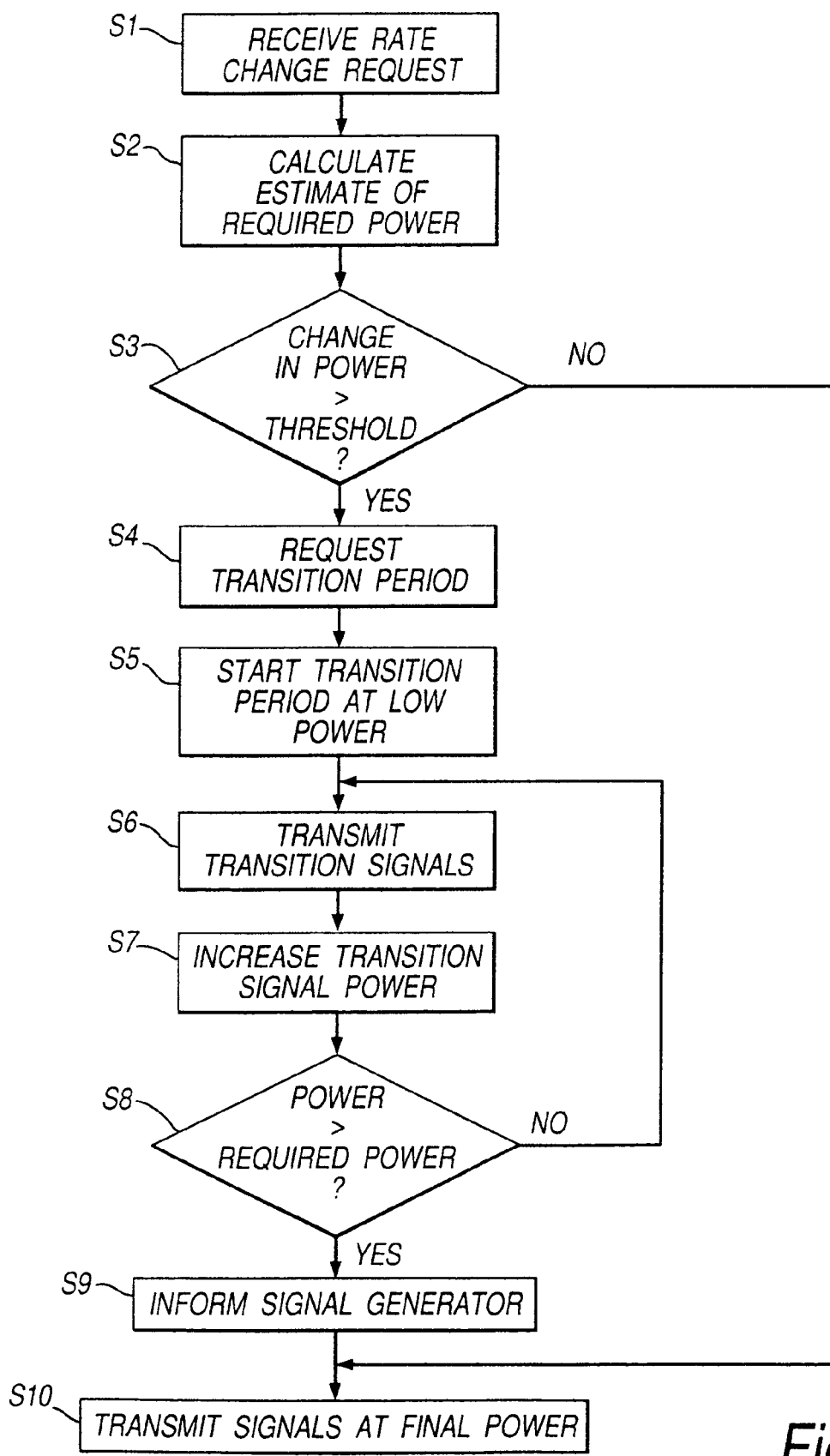
FIG. 3 is a flowchart for use in explaining operation of the mobile communications network of FIG. 2.

Operation of the base station 10 and the user equipment 20 will now be described with reference to the flowchart shown in FIG. 3. The flowchart of FIG. 3 is just one example of the actions which can be taken when a change is requested in the transmission rate of a particular signal which is being transmitted from the base station 10 to the user equipment 20. The example of FIG. 3 is for the case when a rate increase is required. Prior to such a request for a rate change, which is received in step S1 of FIG. 3, the signal generating portion 12 of the base station 10 shown in FIG. 2 could, for example, be idle (effectively a zero transmission rate) or it could be in the process of generating signals at an existing (pre-change) transmission rate for transmission to the user equipment 20 via the transmitter portion 18 of the base station 10 and the receiver portion 22 of the user equipment 20.

In this example, after the rate change request is received in step S1, the signal generating portion 12 uses the requested rate to calculate an estimate of the power which would be required for adequate transmission of future signals to the user equipment 20. Calculation of this required power estimate can be based, for example, on current network conditions or may be based on a set of reference power levels required to achieve various transmission rates according to various network conditions (such reference power levels may be determined by an earlier simulation, for example).

Once this required power estimate has been calculated, in step S3 of FIG. 3 the estimate is examined to determine whether the power change which would be required by transmitting at the required power estimate exceeds a certain predetermined threshold. This step may be performed to determine whether the rate (power) change requested is sufficiently great to cause a significant disturbance to the network. The threshold value may be determined by prior simulation and/or by current network conditions.

If the change is below the threshold, processing continues at step S10, where the signal generating portion proceeds directly to cause signals to be transmitted at the new power determined in step S2. If the power change is determined in step S3 to be greater than the predetermined threshold then processing continues at S4. Note that this step S3 is optional, so that in another example processing could pass straight from S2 to S4 irrespective of the expected power change.

In step S4 the signal generating portion 12 requests the transition control portion 14 to cause a transition operation to be performed in which the network is primed and prepared for the requested power change during a transitional period which expires before the requested rate (power) change is effected. In step S5, the transition control portion 14 selects a starting power, which in this example is preferably lower than the calculated required power estimate of step S2, at which transitional signals will start to be generated and transmitted to the user equipment 20 during the transitional period.

In step S6, a transitional signal is generated by the transitional signal generating portion 16 at the current transitional signal power, and caused to be transmitted by the transmitter portion 18 to the user equipment 20 via the receiver portion 22 of the user equipment 20. In step S7, the transitional signal power is increased by a predetermined step.

In step S8 it is determined whether the new transitional signal power is greater than the required power estimate calculated in S2. If the transitional signal power level is not yet greater than or equal to the required power estimate then processing is returned to step S6 where the ramping up of the transitional signal power level is continued. If it is determined in step S8 that the transitional signal power level has reached the estimated required power determined in step S2, then processing continues in step S9.

In step S9, the transition control portion 14 informs the signal generating portion 12 that the transitional period has expired, and that the signal generating portion can continue to cause signals to be generated and transmitted at the new power which was calculated in step S2.

Figure 4:
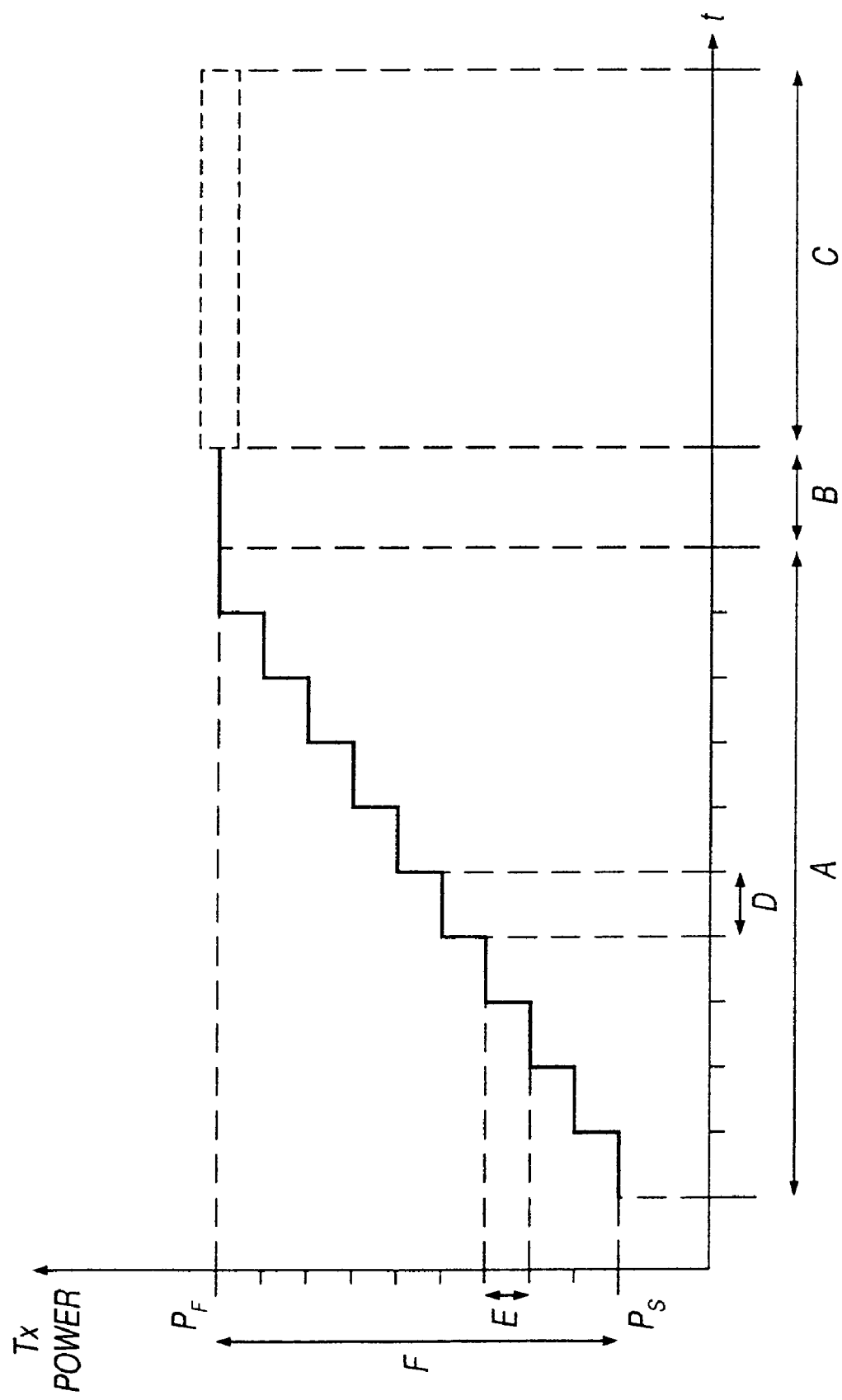
FIG. 4 is a graph showing a first example of the variation of transmission power of transitional signals transmitted during a transitional period.

FIG. 4 is a graph showing a first example of the way in which the transmission power may be varied with time in the transitional period as a result of employing the method shown in FIG. 3. In this example, the transmission power is ramped-up in steps during a transitional (ramping) period A from starting transmission power $P_S$ to final transmission power $P_F$ (steps S5 to S8 of FIG. 3). Following the transitional ramping period A there may follow a short period B, before transmission at the higher rate is performed during period C. The intermediate period B may be useful as a period for performing certain calculations and for transmission of certain control signals prior to actual data packet transmission, as will be explained later. In a CDMA network, when a transition from low rate transmission (for voice and control) to transmission at a high rate (e.g. 2 Mb/s) occurs, the overall power increase can be of the order of 10 to 25 dB, for example. The transitional period A may be of the order of 10 ms (10 ms is envisaged as the duration of a radio frame in a UTRA network). The transitional period may typically be divided up into 15 or so steps (a radio frame in the UTRA network is envisaged as having 15 time slots), resulting in a power increase E for each step of around 0.5 to 1.5 dB, and a step period D (time slot duration) of the order of 667 µs. The likely step sizes in the UTRA network are 0.5, 1, 1.5 and 2 dB.

In FIG. 4 the transitional period A is divided into equal time steps D and equal power steps E are performed in each transitional period D. This results in a linear step-wise increasing transmission power profile during the transitional period A. It will be appreciated that the transmission power profile is not limited to that shown in FIG. 4, but may take several different forms, as will be described below with reference to FIGS. 5A to 5C. However, the power increase E used for each transitional period should preferably not be too large, or in other words the slope of the ramping power profile should not at any point be too steep. This is because, in this example, the transitional period is intended to realize a smooth and gradual increase from a low transmission power to the required high transmission power in a manner which allows other users of the network to gradually adjust their own transmission powers to accommodate the introduction of the new high data (power) transmission in a controlled way. The closed-loop power control mechanism described above which is used by other users of the network is envisaged as allowing transmission power to be increased or decreased in a 1 or 2 dB step per time slot. Therefore, to enable those users to adjust their transmission powers fast enough, the rate of change in transitional signal power should preferably not be much greater than 2 dB per time-slot duration (0.667 ms), still more preferably no more than 1 dB per time-slot duration.

A further consideration is that it may take up to 3 time slots in practice for the effects on other users of a power change for a particular user to work through fully. This also limits the desirable maximum rate of change of power levels in the transitional period.

Figure 5A:
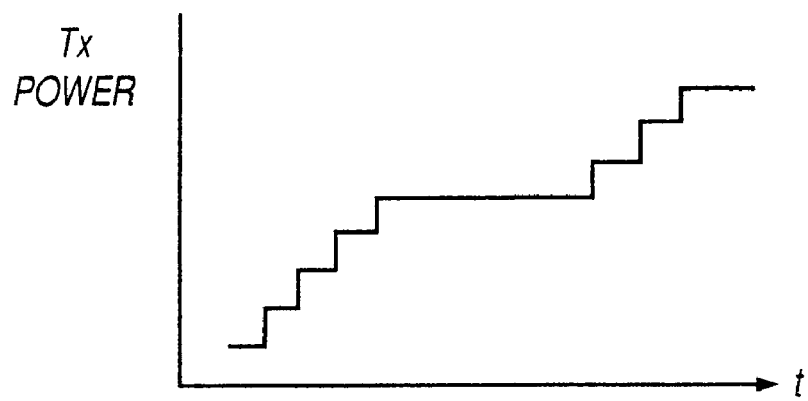
FIG. 5 shows further examples of possible power variations of the transitional signals.
Figure 5B:
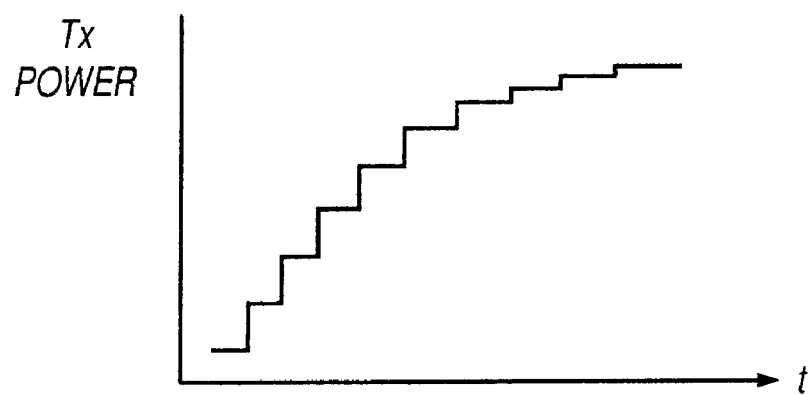
Figure 5C:
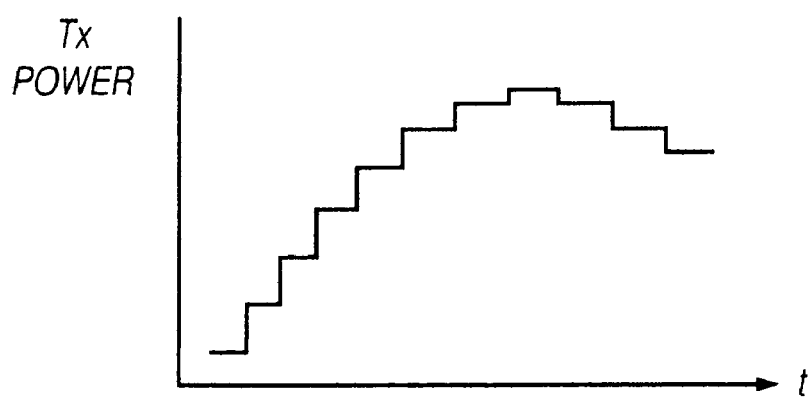

FIGS. 5A to 5C show more examples of transition signal power profiles which can be used as an alternative to that shown in FIG. 4. FIG. 5A shows a profile consisting of two linearly increasing phase, but with a constant power level in a middle phase which may provide time in which the network can react to the first increasing phase. Similarly there may be provided a constant power level portion towards the end of the transitional period in order to allow the network to stabilise. FIG. 5B shows a power profile in which the power steps are large to begin with, but the power step size gradually decreases as the transitional period progresses. This allows a large transmission power range to be covered, but also provides for small steps towards the end of the transitional period in order to give the network a change to stabilise. FIG. 5C shows a profile in which the power of the transitional signals increases to-a-maximum before decreasing slightly towards the end.

In the examples described above, the transmission power is varied according to a predetermined power profile in the transitional period. The predetermined power profile may be a power profile selected from amongst a plurality of available profiles (e.g. FIGS. 5A to 5C) by the transition control portion. The selection may be based on a number of different criteria, for example the amount of the rate change, the volume of other users or signal conditions in the network.

Figure 6:
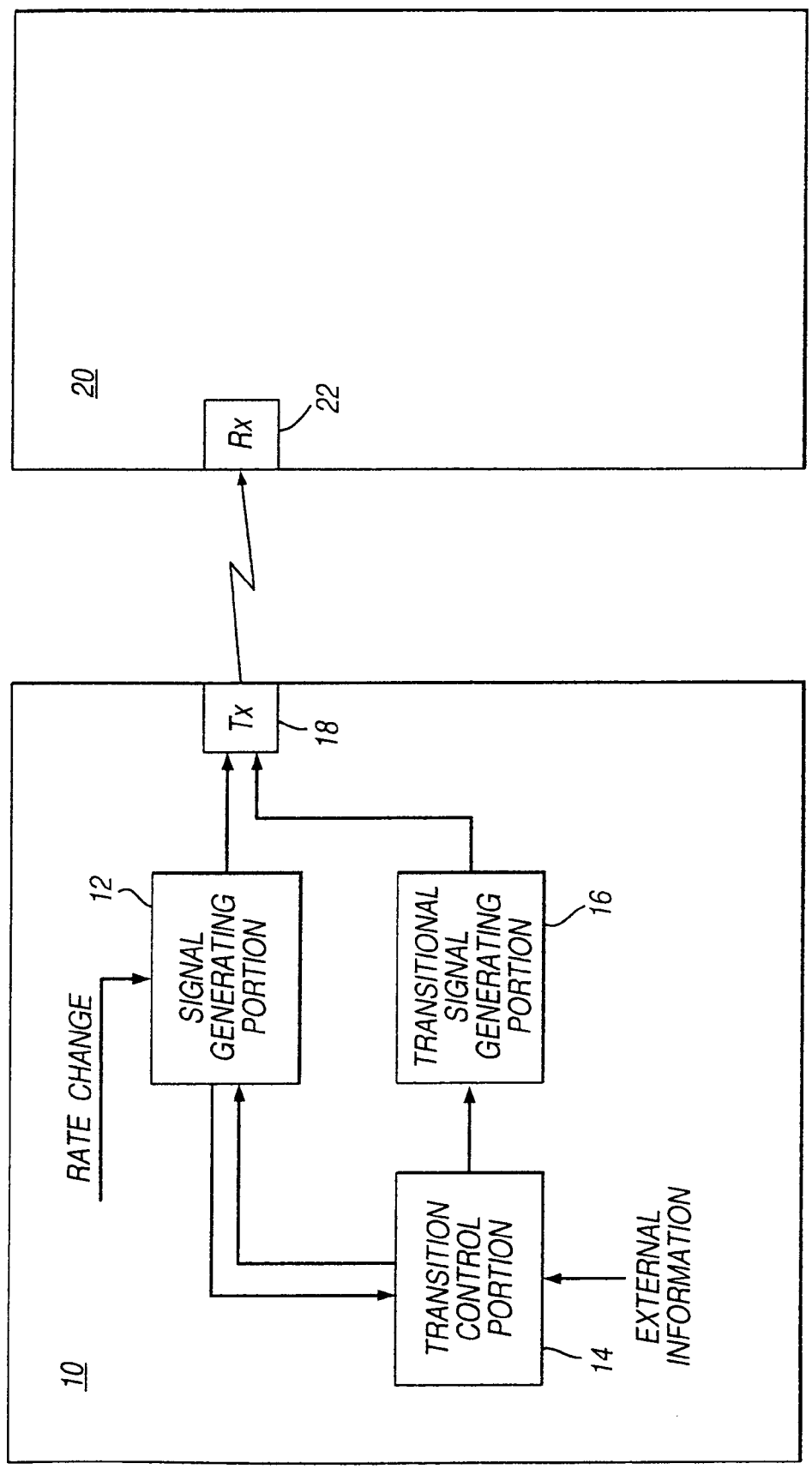
FIG. 6 shows a modification to the mobile communications network shown in FIG. 2.

FIG. 6 shows a modification to the mobile communications network embodying the invention shown in FIG. 2. The FIG. 6 network also includes a base station 10 and user equipment 20. The base station 10 includes a signal generating portion 12, a transition control portion 14, a transitional signal generating portion 16 and a transmitter portion 18. The user equipment 20 includes a receiver portion 22. In this embodiment of the invention, the transition control portion 14 of the base station 10 includes an input for receiving external information which can be used by the transition control portion 14 to modify the profile of the transitional signal power during the course of the transitional period described above. The external information may be generated by the UE 20 or by the BS 10 or by a combination of both the UE and BS. Therefore the shape of the transitional signal power profile may vary in dependence upon this external information. The external information could be used to select one of the available profiles or to alter the shape of a particular profile from a default shape (e.g. limiting the rate of rise still further or capping the maximum power) or to configure the profile on the fly.

Figure 7:
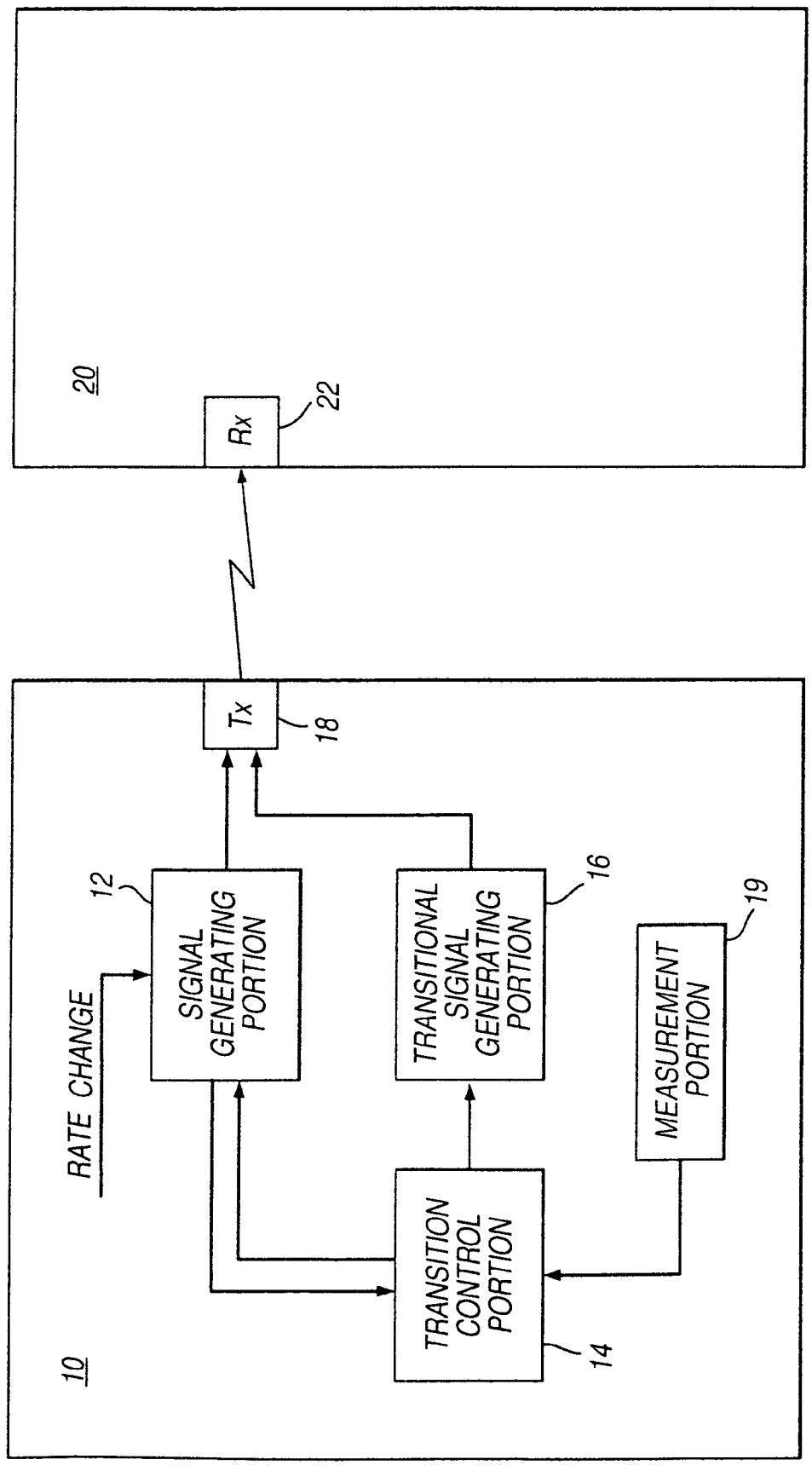
FIG. 7 is a block diagram showing parts of another mobile communications network embodying the first aspect of the present invention.

FIG. 7 shows an embodiment of the present invention in which the external information discussed above in relation to FIG. 6 is provided from within the base station 10 by providing the base station 10, in addition to those features shown in FIG. 6, with a measurement portion 19. The measurement portion 19 measures at the base station 10 one or more aspects of network performance or signal conditions in the network which are useful for controlling the transmission power of the transitional signals on a certain channel during the transition period. For example, the base station 10 has knowledge of the maximum total power which can be transmitted from that base station 10. It also has knowledge of the total power which is being used by the existing users of that base station 10. The measurement portion 19 can therefore use this information to control and restrict the power which is used for transmission on the requested channel so that the power profile shown in FIG. 4 may be capped once the power reaches a certain level.

The measurement portion 19 of the base station 10 can also make measurements of other aspects of network performance and congestion in order to control the transitional signal power profile during the transition period.

Figure 8:
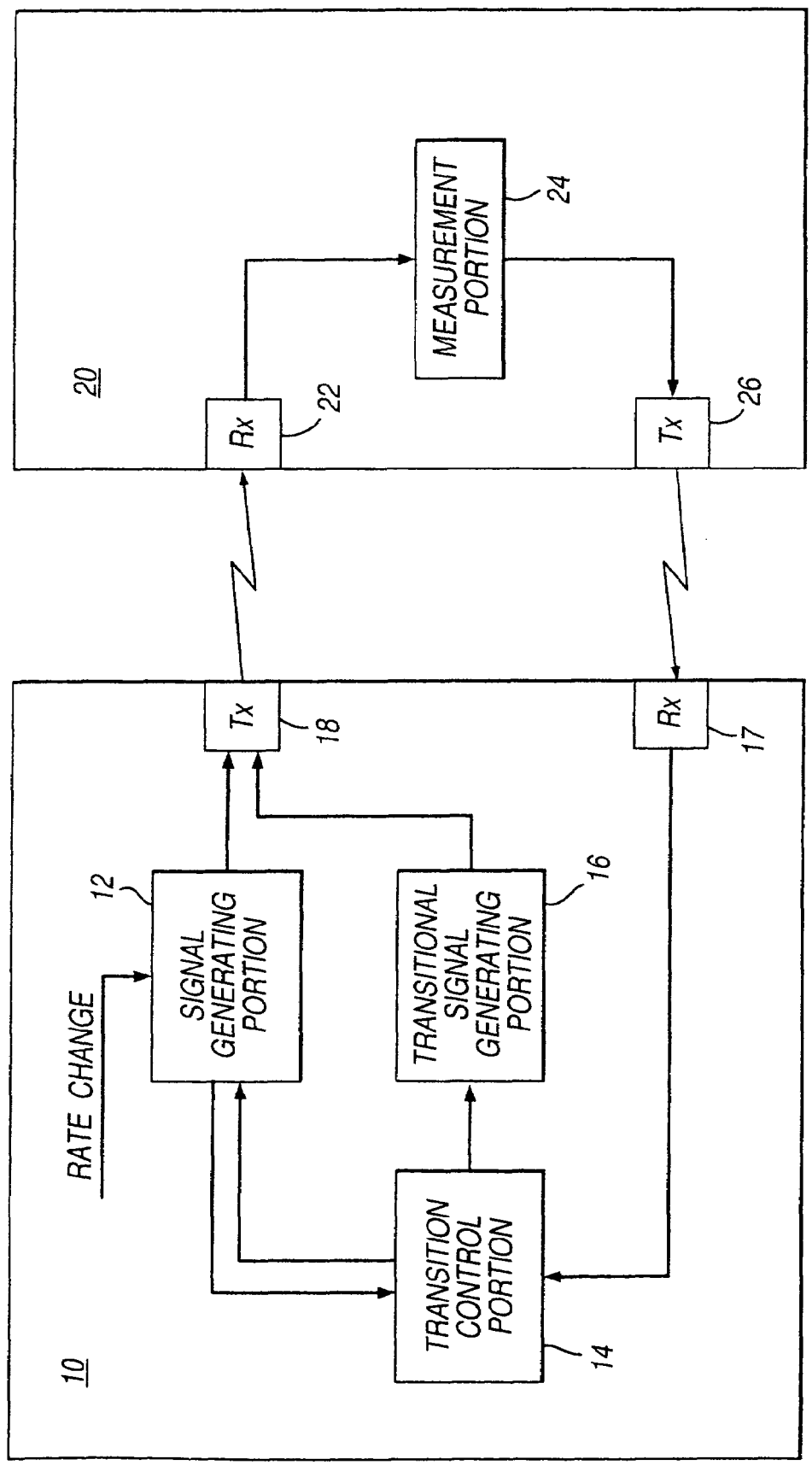
FIG. 8 is a block diagram showing parts of a mobile communications network embodying the first aspect of the present invention.

FIG. 8 shows an embodiment of the present invention in which the external information of FIG. 6 is provided from the user equipment 20. In this embodiment, the mobile communications network is provided with a base station 10 comprising a signal generating portion 12, a transition control portion 14, a transitional signal generating portion 16, a transmitter portion 18 and a receiver portion 17. The user equipment 20 is provided with a receiver portion 22, a measurement portion 24 and a transmitter portion 26. The FIG. 8 embodiment is similar to the FIG. 7 embodiment, but the feedback information is provided by a measurement portion 24 contained within the user equipment 20, rather than in the base station 10.

As mentioned above, the channel conditions at the UE are very difficult for the BTS to estimate accurately in a timely manner. The channel conditions depend on factors, such as for example, the inter-cell interference level, the delay profile and the fading condition of the multipaths. The required power level to achieve a chosen data rate (for example the required power level estimate in step S2 of the method shown in FIG. 3 described above) is difficult to predict reliably and accurately due to the high variation of channel conditions between different users located in different places with different fading conditions and so on. As a result, there can be an order of magnitude difference in the power level required to be used to achieve the same data rate under different conditions. Conversely, it is also the case that, using a certain transmission power level, widely differing data rates may be achievable for two users which are experiencing widely differing fading conditions.

Figure 9:
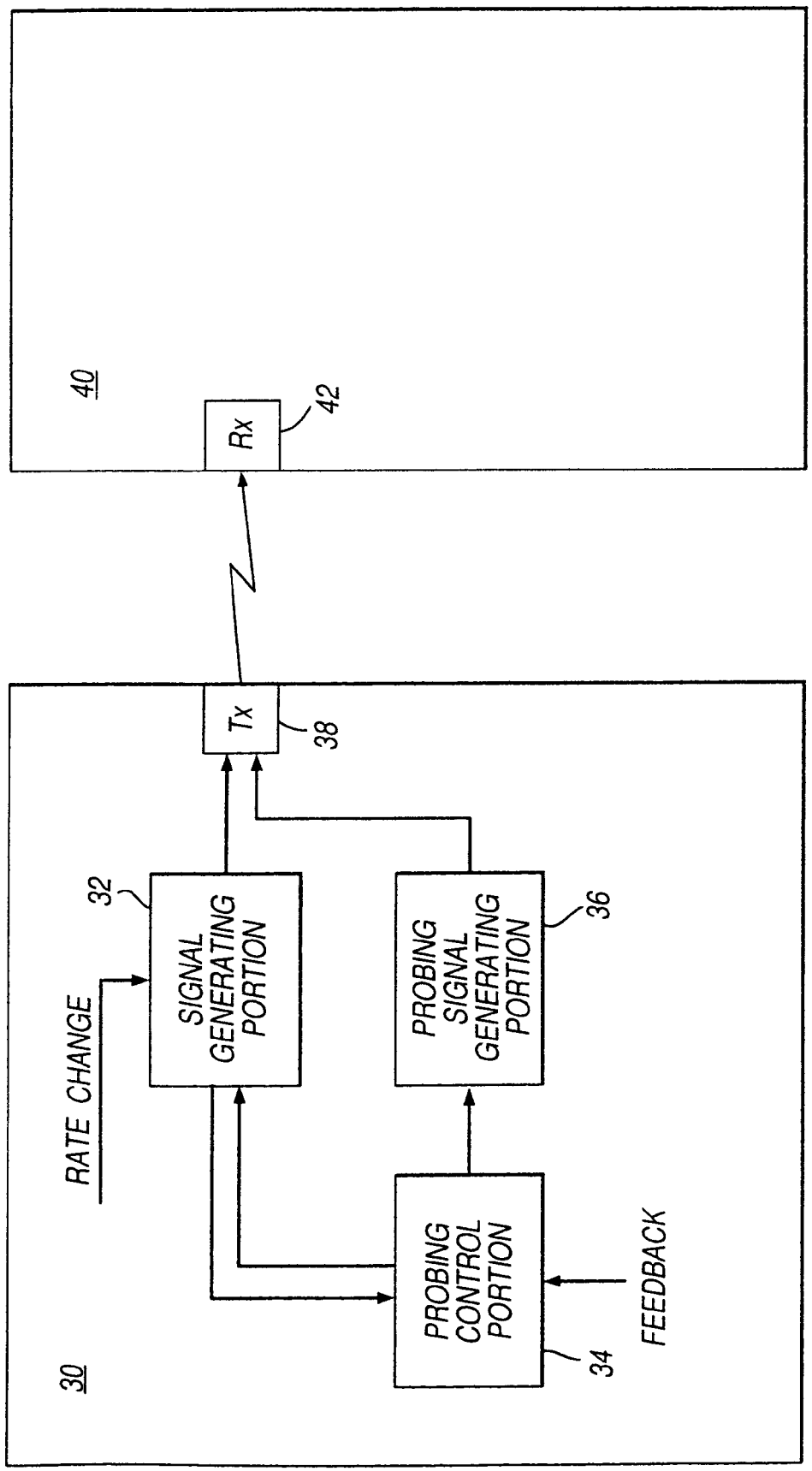
FIG. 9 is a block diagram showing parts of a mobile communications network embodying a second aspect of the present invention.

FIG. 9 is a block diagram showing an embodiment of another aspect of the present invention in which a mobile communications network includes a base station (BS) 30 and user equipment (UE) 40. The base station 30 is provided with a signal generating portion 32, a probing control portion 34, a probing signal generating portion 36 and a transmitter portion 38. The user equipment 40 is provided with a receiver portion 42.

As will be described in more detail below, the probing control portion 34 and the probing signal generating portion 36 cooperate, prior to a change in transmission rate of a pre-selected signal (generated by the signal generating portion 32) which is being transmitted from the base station 30 to the user equipment 40, to cause probing signals to be transmitted from the base station 30 to the user equipment 40 at one or more probing power levels.

Following transmission of such probing signals, the results of transmission of the probing signals are measured and provided as a feedback signal to the probing control portion 34 in order to provide information relating to a likely relationship between the transmission rate and transmission power of the preselected signal once the above-mentioned change in transmission rate is made.

This probing period expires before the start of transmission of data at the new rate.

The information gained from performing this probing process may be a transmission rate which, when the above-mentioned transmission rate change is effected, is considered to be achievable at a chosen (target) power level of the pre-selected signal, taking into account the existing signal conditions in the network. The chosen (target) power level could be the maximum allowable power level in the network, for example.

Alternatively, the information may be a power level at which the signal is considered to be required to be transmitted, when the transmission rate change is effected, to achieve a chosen (target) transmission rate.

Alternatively, the information may be the combination of a suggested transmission rate and a suggested transmission power suitable for use when the rate change is effected.

Alternatively, the information may be a decision result which indicates purely whether or not a chosen (target) transmission rate is achievable at a transmission power level within a preselected range of allowable power levels of the base station 30.

The information can also be used in other ways in order to make a decision on the power and/or the transmission rate to be used following the probing period.

Figure 10:
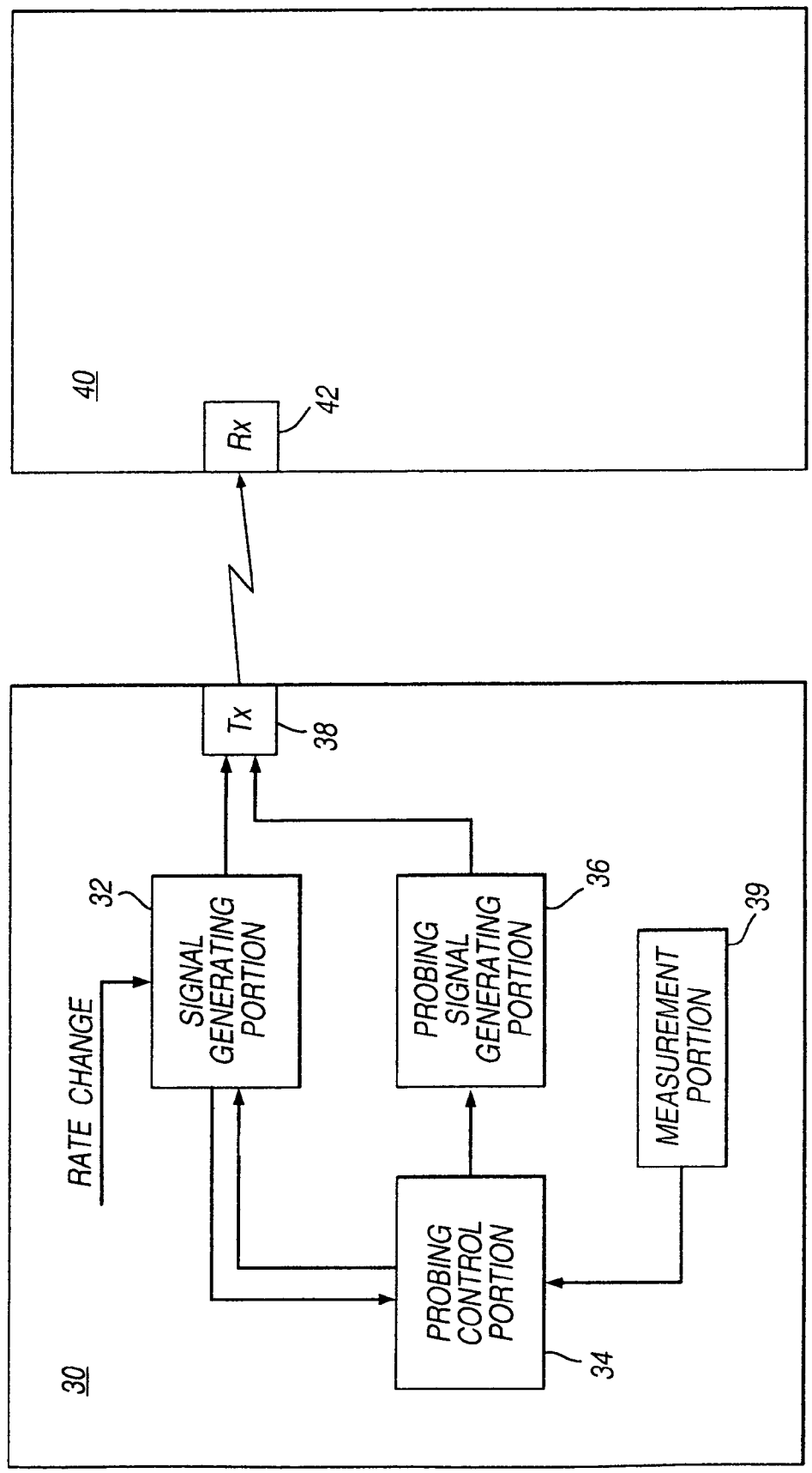
FIG. 10 is a block diagram showing parts of another mobile communications network embodying the second aspect of the present invention.

FIG. 10 shows an embodiment of the present invention in which the feedback information of FIG. 9 is provided from within the base station 30 by a measurement portion 39 contained within the base station 30.

One possible mode of operation of the base station 30 and the user equipment 40 of FIG. 10 will now be described with reference to the flowchart shown in FIG. 11. In step P1, a rate change request is received by the signal generating portion 32. In this example, the requested rate change is a request to increase the transmission rate of a preselected signal which is being generated by the signal generating portion 32 for transmission on a certain channel to the user equipment 40. In step P2, the signal generating portion 32 uses the requested rate to determine an estimate $P_{req}$ of the power required for adequate transmission of data signals (e.g. packets) to the user equipment 40 once the rate change is effected. Determination of this required power estimate $P_{req}$ may be based on a reference look-up table containing mapping information about the power levels expected to be required to achieve various different transmission rates (such a reference look-up table may be compiled based on results of a previously-performed simulation, for example). The loop-up table may contain different sets of mapping information corresponding to different respective possible network conditions.

Next, the signal generating portion 32 causes the probing control portion 34 to start a probing operation to be performed in which probing signals are transmitted from the base station 30 to the mobile station 40 before the requested rate change is effected. In step P3, the probing control portion 34 sets the initial transmission power of the probing signal generating portion 36 to a power which is lower than the estimate $P_{req}$ of the required power determined in step P2. This initial transmission power may be a fixed value or a fixed proportion (e.g. 25%) of the estimate $P_{req}$ determined in step P2, or power may differ by a fixed amount (e.g. 15 dB) from the estimate $P_{req}$.

A probing signal is generated in step P4 and transmitted to the user equipment 40 at the probing signal power set by the probing control portion. In step P5 the probing signal power is increased by a predetermined power step and in P6 a determination is made as to whether the current probing signal power has yet reached the required power estimate $P_{req}$. If the probing signal power level is lower than the required power estimate, then processing is returned to step P4 where the next probing signal power level is transmitted. If it is determined in step P6 that the probing signal power level has reached the estimated required power $P_{req}$, then processing continues in step P7.

Figure 11:
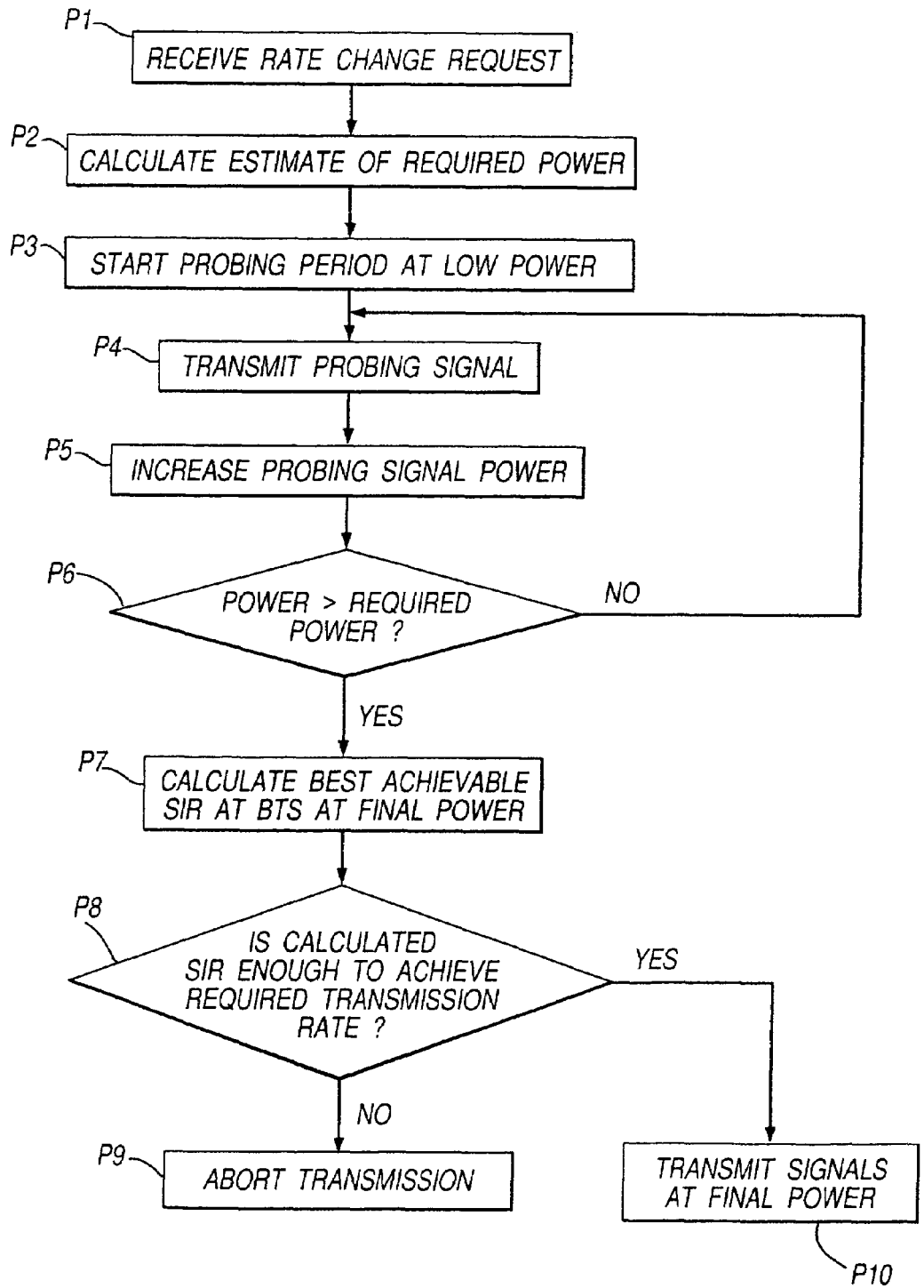
FIG. 11 is a flowchart for use in explaining operation of the mobile communications network shown in FIG. 10.

In the example process of FIG. 11, by repeating the loop step P4 to step P6, a series of probing signals is transmitted from the base station 30 to the user equipment 40 at gradually increasing power levels.

By the end of the probing period, prior to actual transmission of the requested signal associated with the new transmission rate, the network has adjusted in a stable manner to the base station 30 transmitting probing signals at a power level which is equivalent to the power level which is to be used after the rate change is effected.

At the end of this probing period, therefore, it is possible to measure results of transmitting the probing signals at the estimated required power level $P_{req}$ and to employ the measurement results to provide information relating to a likely relationship between the requested transmission rate and the estimated transmission power after the rate change is effected.

In this example, these measurements are performed in step P7 by the measurement portion 39 of the base station 30. In step P7, the measurement portion estimates the maximum achievable signal to interference ratio (SIR) at the base station 30 according to the following formula:

$$SIR_{max} = \frac{P_{final}}{P_{used} - P_{final}}$$

where $P_{final}$ is the probing-signal power at the end of the probing period (equal or close to $P_{req}$ in this embodiment) and $P_{used}$ is the total power transmitted to all users of the base station (including the user equipment in question) at the end of the probing period.

The signal to interference ratio experienced at the user equipment 40, which is the true factor influencing what transmission power is required or what maximum transmission rate is achievable, will of course be different from (always lower than) the SIR measure produced at the base station 30 since the user equipment 40 will experience varying fading conditions and will also experience interference from transmitters other than the base station 30 in question, for example from other base stations of the network. Thus, the SIR measure is a measure of maximum SIR at the UE. However, the estimate of the maximum achievable signal to interference ratio calculated in step P7 of FIG. 11 can still provide worthwhile information relating to whether the rate change requested in step P1 is achievable or not at the transmission power $P_{req}$ estimated in step P2, as will be explained below.

In step P8 of the flowchart of FIG. 11, the measurement portion 39 passes the measure of maximum achievable SIR calculated in step P7 to the probing control portion 34. The probing control portion 34 uses the SIR measure to determine whether or not the requested transmission rate (or equivalently the estimated required power to achieve that requested transmission rate) is achievable. This can be carried out by using predetermined mapping information, indicating the correspondence between data rates achievable at various SIR values, to map the SIR measure calculated in step P7 to a maximum achievable transmission rate. If this maximum achievable transmission rate obtained using the mapping information is greater than the transmission rate which was requested in step P1 then the probing control portion 34 informs the signal generating portion 32 that transmission is to proceed at the estimated power $P_{req}$ (step P10).

If it is determined in step P8 that the maximum achievable data rate is less than the requested transmission rate, then processing proceeds to step P9 where in this example the requested transmission is aborted. In this case, transmission of a non-receivable high transmission rate data packet would be avoided, and therefore the impact on the network of such a non-receivable packet would be reduced. As an alternative to simply aborting the transmission it is also possible to introduce an extra power increase beyond the power $P_{req}$ which was estimated in the step P2 before transmission of signals at the new transmission rate in order to increase the likelihood of successful reception.

Before proceeding with such an extra power increase, a check could first be made to determine whether there might not be sufficient spare capacity by calculating the maximum achievable extra marginal SIR at the BTS available:

$$SIR_{marg} = \frac{P_{marg}}{P_{used}}$$

where $P_{USED}$ is the total power used by the existing users of the base station 30 and $P_{MARG}$ is the spare power capacity available at the base station 30 (i.e. $P_{MARG} = P_{MAX} - P_{USED}$ where $P_{MAX}$ is the maximum power which can be transmitted by the base station 30). If this "spare" SIR is still not sufficient to achieve the requested transmission rate, then transmission would be aborted without making the power increase. A similar estimation of the "spare" SIR available could even be made before ramping to determine whether or not the requested rate might be achievable at the estimated power level.

It will be appreciated that, since the SIR measure produced in step P7 is the best achievable signal to interference ratio at the base station 30, even if the determination in step P8 is that this SIR measure is sufficient to achieve the required transmission rate, the actual SIR which is experienced at the user equipment 40 (which actually determines whether the transmission rate is achievable at that transmission power) may not be sufficient to ensure successful transmission. Therefore, instead of proceeding with transmitting signals at the estimated power in step P10, a further back-up measurement may optionally be performed (for example, by the UE—see below) based on the received probing signals in order to make a more accurate determination of whether the requested transmission rate is achievable at the user equipment 40.

It will be appreciated that in the FIG. 11 operation the probing signals increase in power in a gradual fashion in a similar way to the transitional signals described above with reference to FIG. 4. In this example, therefore, the probing signal power profile is similar to the transitional signal power profile in FIG. 4. Since each power increase during the probing period is relatively small, other users in the vicinity area able to react to the gradually-increasing power levels of the probing signal transmissions from the base station 30 by making suitable adjustments to their own power levels.

Figure 12:
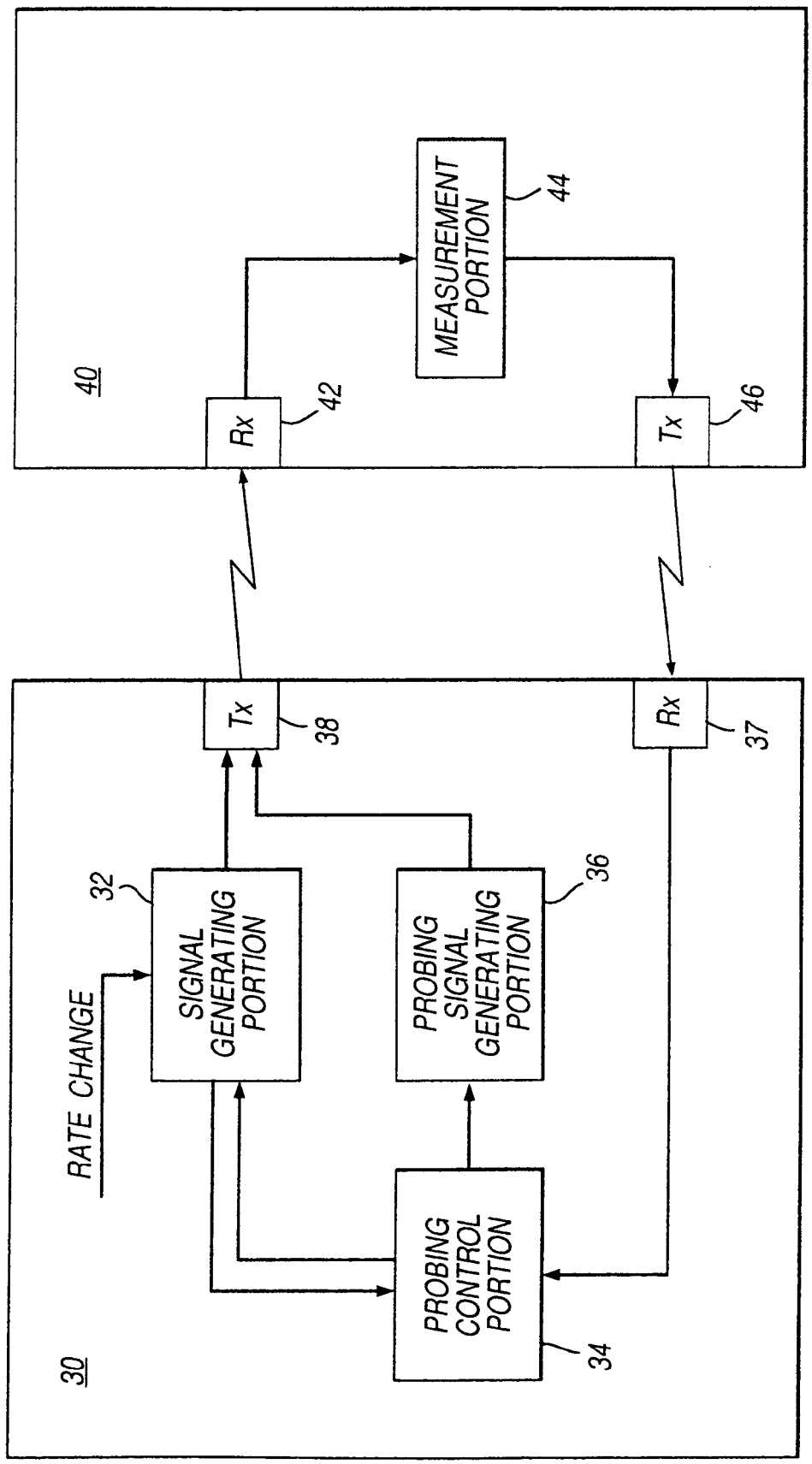
FIG. 12 is a block diagram showing parts of another mobile communications network embodying the second aspect of the present invention.

FIG. 12 is a block diagram showing an embodiment of the present invention where the feedback signal shown in FIG. 9 described above is provided by measurements carried out at the user equipment 40, rather than at the base station 30 as was the case in the embodiment described above with reference to FIGS. 10 and 11. In the FIG. 12 embodiment, the base station 30 comprises a signal generating portion 32, a probing control portion 34, a probing signal generating portion 36, a transmitter portion 38 and a receiver portion 37. The user equipment 40 comprises a receiver portion 42, a measurement portion 44 and a transmitter portion 46. The main difference between the FIG. 12 embodiment and the FIG. 10 embodiment is that the measurement portion, which provides feedback to the probing control portion 34 within the base station 30, is provided within the user equipment 40 rather than within the base station 30.

One possible mode of operation of the base station 30 and the user equipment 40 of FIG. 12 will now be described with reference to the flowchart shown in FIG. 13.

Figure 13:
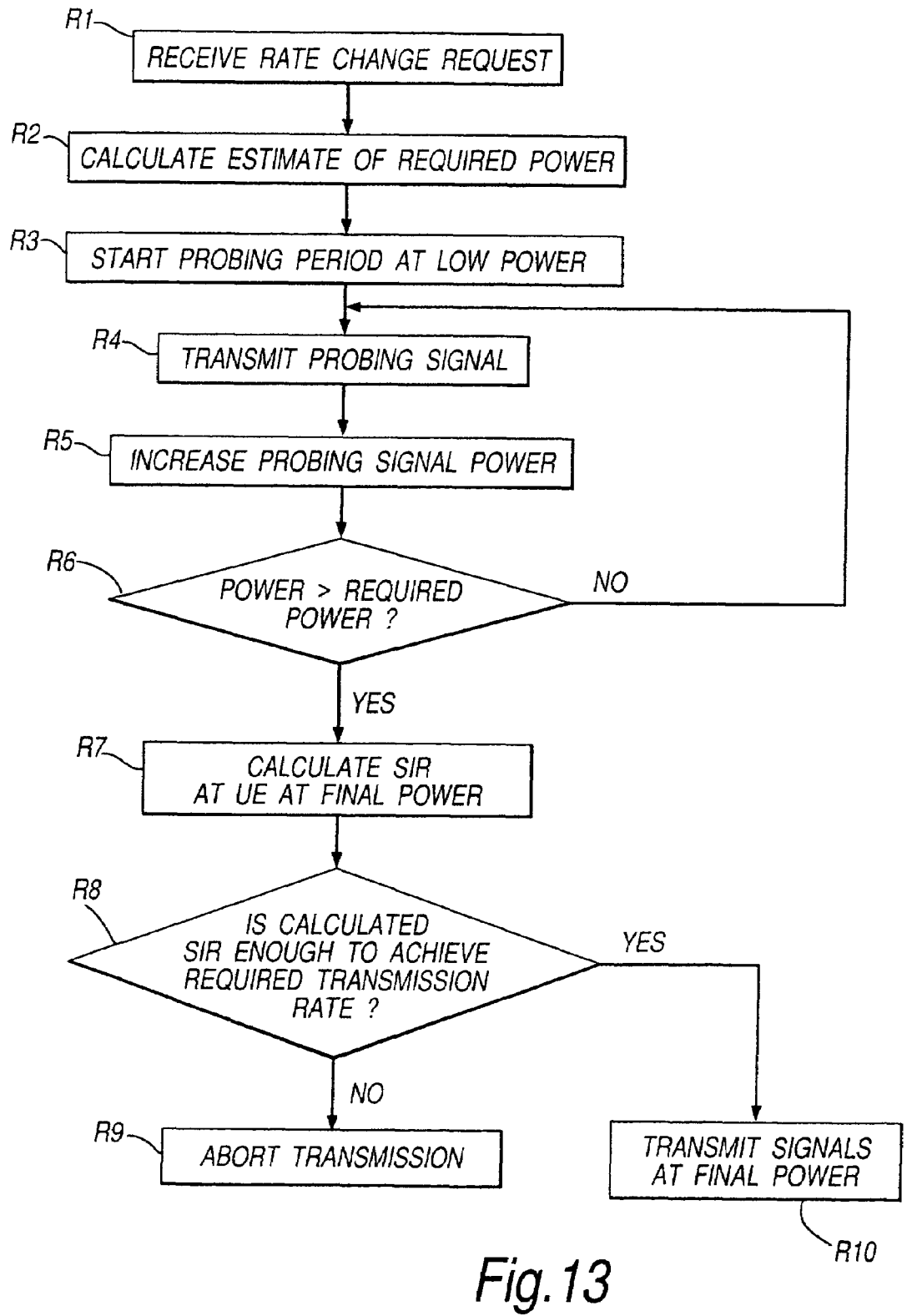
FIG. 13 is a flowchart for use in explaining operation of the mobile communications network shown in FIG. 12.

Steps R1 to R6 of the FIG. 13 operation correspond respectively to steps P1 to P6 of the FIG. 11 operation as already described, and the description of these steps is not repeated here.

In step R7, when the probing signal has reached its final value $P_{req}$, the measurement portion 44 measures signal to interference ratio (SIR) at the user equipment 40. In step R8, the transmitter portion 46 causes the SIR measure produced by the measurement portion 44 to be transmitted to the receiver portion 37 of the base station 30. The receiver portion 37 forwards the SIR measure to the probing control portion 34 which uses the SIR measure to determine whether or not the requested transmission rate (or equivalently the estimated required power $P_{req}$ to achieve that requested transmission rate) is achievable. This step R8 can be carried out in the same way as step P8 in FIG. 11. If the achievable transmission rate is greater than the transmission rate which was requested in step R1 then the probing control portion 34 informs the signal generating portion 32 that transmission is to proceed at the previously-estimated power (step R10). If it is determined in step R8 that the achievable data rate is less than the requested transmission rate, then processing proceeds to step R9 where in this example the requested transmission is aborted.

Instead of the user equipment 40 waiting until the end of the probing period and measuring the signal to interference ratio only at the final probing signal transmission power $P_{req}$, it is also possible for the measurement portion 44 of the user equipment 40 to measure the signal to interference ratio throughout the probing period, for example after each probing signal is received by the receiver portion 42 from the base station 30. A series of SIR measures could then be fed back to the probing control portion 34 of the base station 30 during the probing period, via the transmitter portion 46 of the user equipment 40 and the receiver portion 37 of the base station 30. The probing control portion 34 could make use of this continual feedback from the user equipment 40 of the signal to interference ratio being experienced at the user equipment 40 in order to modify the profile of the power of the probing signals which are being generated during the probing period, or to stop the further transmission of such probing signals altogether.

For example, the SIR measures being fed back during the probing period may indicate that the requested transmission rate is achievable at a power level below the estimated required power $P_{req}$. In this case the probing control portion 34 could stop any further probing signals being transmitted or stop any further increase in probing signal power, causing the probing signal power to remain constant at that lower power for the remainder of the probing period.

On the other hand, the feedback information from the user equipment 40 may indicate that as the power of the probing signals is ramped up, the measured SIR at the user equipment 40 rises initially but begins to tail off or even fall. This situation may indicate an interference-limited scenario in which the requested transmission rate is not achievable. In this case, the base station 30 could either prevent any subsequent transmission from being carried out, or it could choose to transmit at a lower transmission rate which could be determined from the information (SIR measures) fed back during the probing period.

In the example described above with reference to FIGS. 10 to 13, an estimated transmission power was initially determined so that the power of the probing signals could be ramped up from a low power towards this estimated power in order to make the determination as to whether that initial estimation was achievable. It is also possible to use the probing period to make the determination of the minimum transmission power which should be used to achieve a target transmission rate with no initial estimation of that transmission power. For example, the power of the probing signal could simply be ramped up from a preset start power level to a preset end power level. Also, the start and end powers could be chosen so that the range of power levels of the probing signals spans a range including the estimated required power level. For example, the estimated required power level could be midway between the start and end power levels.

The probing period can be used in various other ways to probe the relationship between transmission power and achievable transmission rate prior to a transmission rate change. For example, the probing period can consist of one or more probing signals transmitted at a single power level in order to determine the achievable transmission rate at that power level. This power level may, for example, be the maximum one allowed by the transmitter (base station).

Instead of, or as well as, measuring the SIR of the received probing signals, measurements of other aspects of the channel quality can also be made, for example fading and delay spread.

In the examples described above with reference to FIGS. 11 and 13, the power of the probing signals was ramped up gradually from a low level up to the estimated required power level $P_{req}$. In this respect the power profile of such probing signals is similar to the power profile of the transitional signals described with reference to FIG. 4. In those examples, therefore, the probing signals serve not only to probe the relationship between transmission power and the transmission rate during the probing period but also serve an equivalent function to the-transitional signals by raising the transmission power level in a stable manner.

Although it is preferable that the power of the probing signals is varied in small steps to finish at a power level equal or close to that which will be required for subsequent transmission of signals following the probing period, it is not essential that this is the case. For example, the power of the probing signals could be ramped up gradually from a low level to a high level and then back down to a low level during the probing period. This would enable measurements to be taken twice for each probing signal power level. The step in power level from one probing signal to another could also be larger than the maximum suggested above in relation to the transitional probing signals (greater than 2 dB for example). However, the network should preferably be allowed sufficient time to react to the probing signal power changes before any measurements are taken.

The or each SIR measure sent from the UE 40 to the probing control portion 34 in FIG. 12 may be an explicit SIR measure or any other suitable expression of the SIR such as a change in SIR from one measure to the next. For example, each SIR measure produced by the measurement portion 44 could be converted into a transmission signal having one of three possible states, the three states corresponding respectively to an SIR increase, an SIR decrease or no change in SIR compared to the previous measure. Further possible states could be introduced such as states corresponding to fast and slow increases and decreases respectively.

Although the use of a feedback signal having a limited number of states provides less comprehensive feedback information, it involves less overhead on the uplink signals transmitted from the UE 40 to the BTS 30 than transmission of an explicit SIR value.

For example, it would even be possible to make use of the existing transmit power control (TPC) commands already transmitted by the UE 40 in the uplink direction to the BTS 30 for use by the BTS 30 to control its downlink transmission powers to the UE 40. These TPC commands inform the BTS that the SIR is improving (power up) or saturated (no change of power). If TPC commands are used to provide the feedback information, the BTS 30 may be configured in the probing period to effectively ignore the TPC commands for downlink power control purposes, so that the probing signal generation portion 36 can generate probing signals having a preselected power profile irrespective of the TPC commands received from the UE 40. Alternatively, the TPC commands may be used to influence the power profile of the probing signals to at least some degree, for example by adjusting the step size according to the pattern of the TPC commands.

The feedback information sent from the UE 40 to the BTS 30 is not limited to transmission of SIR measures. In another embodiment, it is possible for the UE 40 to carry out some or all of the processing of the steps R8 to R10 in the FIG. 13 flowchart. For example, the or each SIR measure produced by the measurement portion 44 may be mapped to an achievable data rate within the UE 40, rather than in the BTS 30. In this way, the feedback information could simply be one or more achievable data rates (corresponding to the different probing signal power levels).

Alternatively, if the UE has knowledge of the target data rate after the rate change is effected (for which see below) the UE 40 can itself make a final decision as to whether or not the results of the transmission of the probing signals (e.g. the SIR measures and corresponding achievable data rates) indicate that transmission at the target data rate is achievable. In this case, the feedback information sent from the UE 40 to the BS 30 could simply be a "go/no-go" decision result indicating whether or not the BTS should effect the requested rate change.

In a further refinement, the UE could inform the BTS explicitly of an expected minimum power at which the target data rate could be achieved, or, if the target data rate is not achievable at any allowable power, suggest a maximum achievable data rate to use instead of the target data rate.

In the embodiments of FIGS. 10 to 13, the probing signal power levels in the probing period are essentially determined in the BTS 30, even though in some cases the power profile may be influenced to some extent by the feedback information sent from the UE 40. In another embodiment of the invention, shown in FIG. 14, the probing signal power levels are controlled by the UE 40 based on the normal closed-loop power control method. In this embodiment, the BTS 30 is constituted in the same basic way as in the FIG. 12 embodiment. One difference over FIG. 12 is that the probing control portion 34 in the BTS 30 is connected to the transmitter portion 38 therein for applying thereto a message MAXP. Another difference is that the rate change request is not generated in the BTS 30 in this embodiment.

Figure 14:
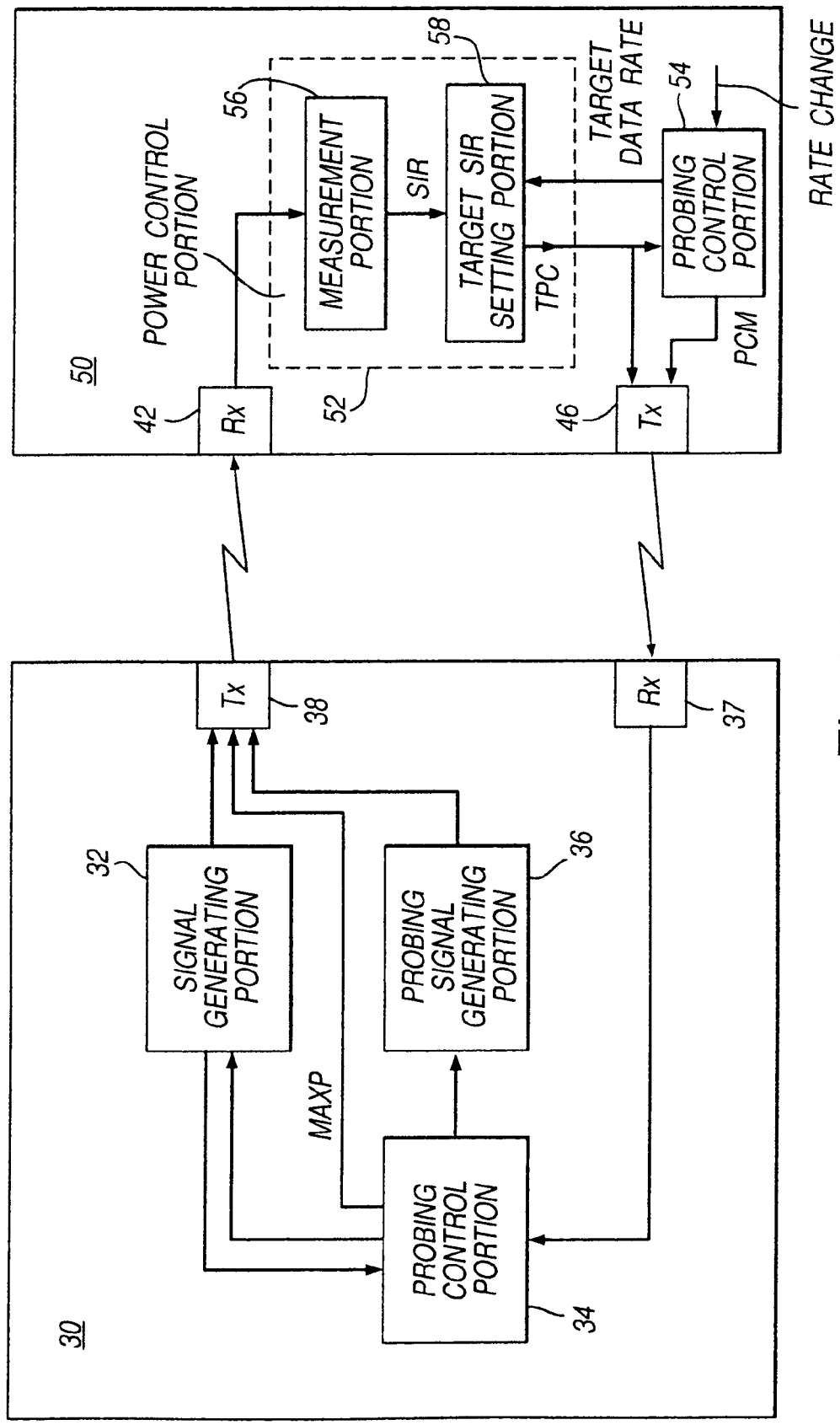
FIG. 14 is a block diagram showing parts of another mobile communications network embodying the second aspect of the present invention.

In FIG. 14 a UE 50 includes, in addition to respective receiver and transmitter portions 42 and 46, a power control portion 52 and a probing control portion 54. The power control portion 52 includes a measurement portion 56, generally similar to the measurement portion 44 in the FIG. 12 embodiment, and a target SIR setting portion 58.

The measurement portion 56 is connected to the target SIR setting portion 58 for applying thereto a series of SIR measures, each SIR measure representing a measure of the SIR of one of the probing signals transmitted to the UE 50 by the BTS 30.

The target SIR setting portion 58 is connected to the probing control portion 54 in the UE 50 for receiving therefrom a target data rate which is the data rate at which the UE wishes to receive data from the BTS 30 following a data rate change. The target SIR setting portion 58 is also connected to the transmitter portion 46 and the probing control portion 54 for applying thereto transmit power control (TPC) commands generated for downlink power control purposes.

The probing control portion 54 is also connected to the transmitter portion 46 for applying thereto probing control messages PCMs.

Next, operation of the FIG. 14 embodiment will be described with reference to FIGS. 15(A), 15(B), 16 and 17.

Figure 15A:
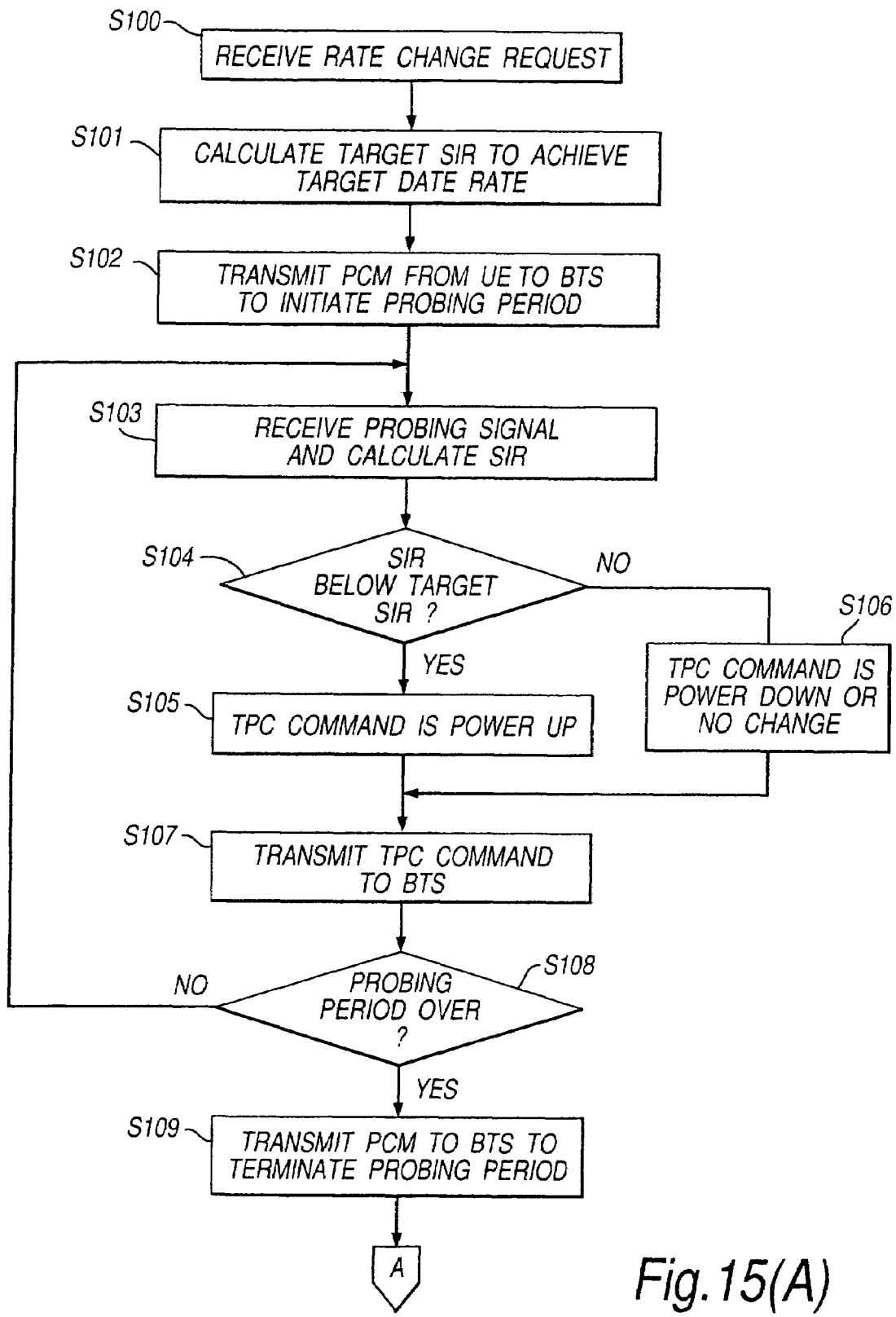
FIGS. 15(A) and 15(B) present a flowchart for use in explaining operation of a user equipment of the FIG. 14 network.
Figure 15B:
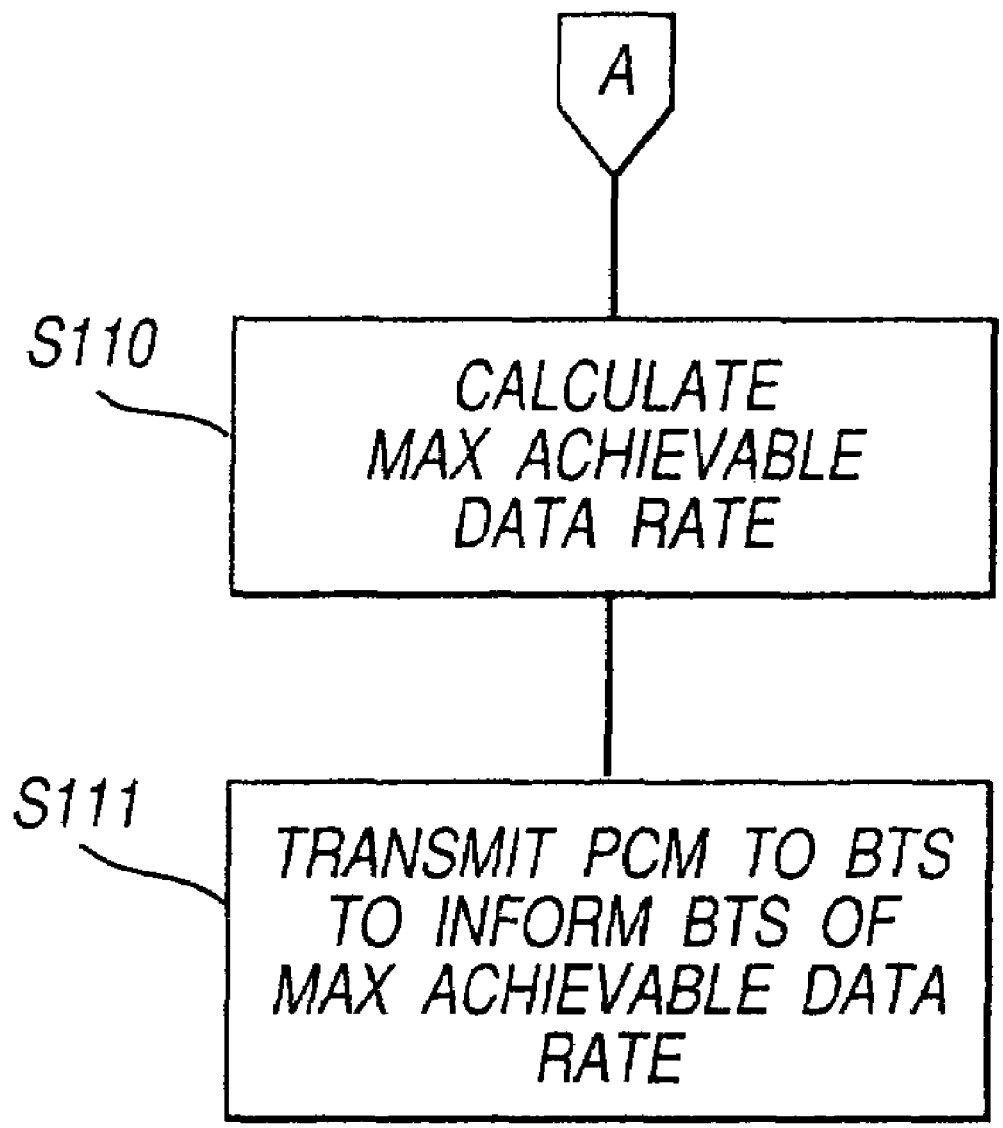

FIGS. 15(A) and (B) present a flowchart for use in explaining the operations performed by the UE 50 in FIG. 14. In a first step S100 the probing control portion 54 in the UE 50 receives a request for a change in transmission rate of a preselected downlink signal from the BTS 30 to the UE 50. The probing control portion 54 outputs to the power control portion 52 a target data rate of the preselected downlink signal once the change is effected. This target rate could simply be a maximum rate at which the UE is capable of receiving downlink signals from the BTS 30.

In step S101 the target SIR setting portion 58 calculates a target SIR value to achieve the specified target data rate, taking account of the delay profile and fading conditions of the downlink channels from the BTS 30 to the UE 50. This target SIR may be determined, for example, using a look-up table holding mapping information indicating the relationship between particular data rates and SIR values under different network conditions.

In step S102 the probing control portion 54 in the UE 50 causes a probing control message PCM to be transmitted in one of the uplink signals to the BTS 30. In this case, the PCM is used by the probing control portion 54 in the UE 50 to inform the probing control portion 34 in the BTS 30 that a probing period is to be initiated.

Figure 16:
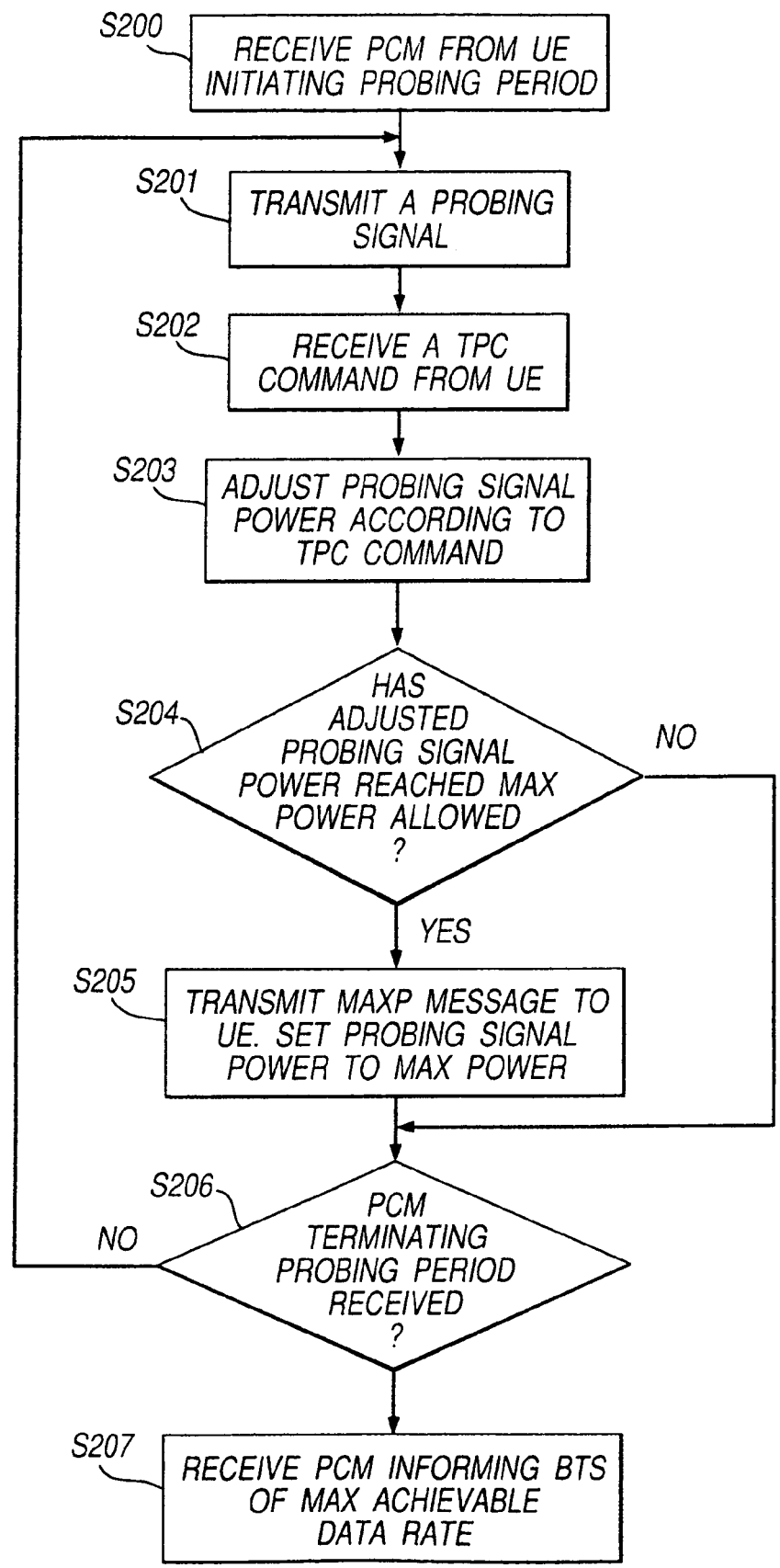
FIG. 16 is a flowchart for use in explaining operation of a base station of the FIG. 14 network.

Referring also now to FIG. 16, which is a flowchart for use in explaining the operations carried out in the BTS 30, the probing-period-initiating PCM is received in a step S200. The receiver portion 37 in the BTS 30 forwards any received PCM to the probing control portion 34 in the BTS 30. In step S201 the probing control portion 34 in the BTS 30 then activates the probing signal generating portion 36 to produce a first probing signal. The power level of this first probing signal may simply be the same as the last power level of a downlink signal sent via the same channel as the probing signal. Alternatively, the first probing signal may have a preselected initial power level, for example a relatively low power level.

At the UE the probing signal is received in a step S103 and a measure of its SIR at the UE is calculated by the measurement portion 56. In step S104 the resulting SIR measure is passed to the target SIR setting portion 58 which compares the SIR measure with the calculated target SIR produced in step S101. If the SIR measure for the probing signal is below the target SIR then, in step S105, a power-up TPC command is issued by the power control portion 52. If, on the other hand, the SIR measure for the probing signal has reached the target SIR then, in step S106, a power-down (or, if available, a no-change) TPC command is issued by the power control portion 52. The TPC command is then transmitted to the BTS in step S107 in one of the uplink signals.

If, say, the rate change is an increase, in step S101 the target SIR value will have been increased and it follows that the effect of the higher target SIR value will be to tend to cause the downlink transmission power to increase initially over the probing period to meet the higher target SIR, for example as shown in FIG. 17.

At the BTS 30 the TPC command is received from the UE in step S202 and, in step S203, the power level for the next probing signal to be transmitted is set according to the received TPC command.

In step S204 the probing control portion 34 in the BTS 30 checks whether the power level set in step S203 for the next probing signal has exceeded a maximum power level permitted by the BTS 30 or by the network as a whole. If so, in step S205 the probing control portion 34 optionally transmits to the UE 50 a message MAXP to inform the probing control portion 54 that the maximum allowed power level has been reached. In step S205 also, the probing signal power level is then capped by the probing control portion 34 at the maximum power level allowed.

In step S206 the probing control portion 34 checks whether a further probing control message PCM has been received from the UE terminating the probing period. If not, processing returns to step S201 for the transmission of the next probing signal.

Reverting now to FIG. 15(A) the UE power-controls the probing signals transmitted to it from the BTS in the probing period until such time as, in step S108, the probing control portion 54 determines that the probing period is to be terminated. The probing period may, for example, be a preset period such as one radio frame (10 ms). Alternatively, the probing period may be varied in duration by the probing control portion 54 depending on the prevailing network conditions. Furthermore, if the probing control portion 34 in the BTS 30 transmits a maximum power message MAXP to the UE during the course of the probing period, the probing control portion 54 in the UE may decide immediately to terminate the probing period on the ground that no further information can be collected.

When the probing control portion 54 determines that the probing period is to be terminated, it transmits a further PCM to the BTS 30 indicating that such termination is to be effected (step S109).

It would also be possible for the probing control portion 54 in the UE 50 to examine the TPC commands produced by the power control portion 52 during the course of the probing period to identify when consecutive power-up commands stop being issued by the power control portion 52. This indicates either that the target SIR has been reached or that the SIR is saturated (and therefore that further power increases are pointless). In this case, the probing control portion 54 could terminate the probing period early and send a PCM terminating the probing period to the BTS at that time.

After the probing period is over, in step S110 the probing control portion 54 examines the results of the transmission by the BTS of the probing signals at the different power levels over the course of the probing period. For example, the SIR measures and TPC commands produced in the probing period in response to the different probing signals may be stored by the probing control portion 54 for this purpose.

Based on the results the probing control portion 54 may provide various kinds of information to the BTS 30 as to how to implement the requested rate change. Firstly, the probing control portion 54 may calculate explicitly a maximum achievable data rate based on the measurement results and communicate this in a PCM to the probing control portion 34. This then communicates the achievable data rate to the signal generating portion 32 (steps S110 and S111 in FIG. 15(B) and step S207 in FIG. 16). Alternatively, the probing control portion 54 could calculate an estimate of the required power level of the transmission from the BTS 30 to the UE 50 to achieve the target data rate once the rate change is effected. This required power level estimate could be communicated in a PCM to the BTS 30. If, as shown in FIG. 17, the target SIR is reached at a certain probing signal in the sequence, for example probing signal 4 the PCM might simply specify "4" to enable the BTS to identify the required power level to achieve the target data rate. Alternatively, as the TPC commands will change to "power down" at this point, the BTS could identify the required power level without any PCM in this case.

A further possibility is for the probing control portion to simply decide that, under the prevailing network conditions, the requested rate change should not be effected at all. In this case the probing control portion 54 could send a PCM to the BTS 30 indicating this decision result.

Embodiments of the present invention described above can be applied to the above-mentioned proposed UTRA network. The standard for the proposed UTRA network is still being developed, and hence the mechanism by which data packet transmissions will be communicated between users has not yet been decided upon. For the uplink, transport channels supporting packet data transfer might include the dedicated channel (DCH), the common packet channel (CPCH) and the random access channel (RACH). For the downlink, the corresponding transport channels might include the dedicated channel (DCH), the downlink shared channel (DSCH) and the forward access channel (FACH).

The DCH is designed for services dedicated to specific user equipment. A DCH is set up prior to packet transmission and the connection is maintained until the end of the intended transmission (connected mode). The transmission power is controlled by the inner-loop power control technique using the physical control channel (PCCH). When in the connected mode, both the uplink and downlink control channels are kept active in order to maintain the link quality, even if there are idle periods between adjacent bursts. Therefore, the DCH is suited for the transfer of large files. In the uplink, as far as the physical layer is concerned, there is little difference between transmitting a file which consists of a large number of packets or sending a long voice message. In the downlink, a number of packet calls may be needed to complete the transmission of a large file. This means that the DCH may be less useful for data transfer in the downlink.

The physical downlink shared channel (PDSCH) used to carry the downlink shared channel (DSCH) is shared by users based on time multiplexing. As the DSCH is always associated with a DCH, the PDSCH is always associated with a downlink DPCH.

Figure 18:
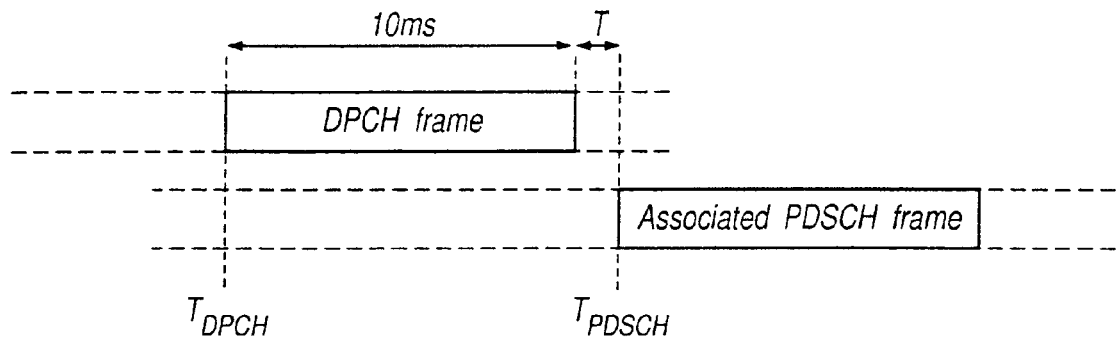
FIG. 18 is a diagram for use in explaining a timing relationship between two UTRA network channels.

The relative timing between a DPCH frame and the associated PDSCH frame is shown in FIG. 18. A downlink dedicated channel (DL DPCH) frame is sent before sending the associated PDSCH frame. Although not many details of the DL DPCH have yet been specified in the UTRA standard, one proposal is to send the transmit format combination indicator (TFCI) for the PDSCH in the DL DPCH. With this proposal, therefore, the data rate for the associated PDSCH would be determined by the base station prior to transmission of the DL DPCH.

The length of a DPCH frame is 10 ms, divided up into 15 time slots of length 0.667 ms. The start of a DPCH frame is denoted $T_{DPCH}$ and the start of the associated PDSCH frame is denoted $T_{PDSCH}$. Any DPCH frame is associated with one PDSCH frame through the relation: 46080 chips $\leq T_{PDSCH} - T_{DPCH} < 84480$ chips. Therefore the associated PDSCH frame starts anywhere between 3 and 18 time slots after the end of the DPCH frame.

When sending the DL DPCH frame, an uplink dedicated physical channel (UL DPCH) is normally set up for power control and other purposes. Generally speaking, the spreading factors used for the DL DPCH and PDSCH are different. Much smaller spreading factors and even parallel codes may be used for the PDSCH. Therefore, the base station normally needs to increase the transmit power substantially at the beginning of the PDSCH. To ensure that appropriate power is used for the PDSCH frame and also to reduce the abrupt interference caused by the PDSCH frame to other services, the technique described above in relation to the previously described embodiments can be applied to UTRA as follows.

In one embodiment, since the base station knows the transmission rate to be used for the PDSCH, it can employ the DL DPCH frame for transmission of probing and/or transitional signals whose transmit powers are varied in a step-wise fashion in the different time slots of the DL DPCH frame. In the meantime, the UE can estimate-the data rate achievable at the transmit power used in each time slot. In the gap between the end of the DL DPCH frame and the beginning of the associated PDSCH frame, the UE can decode the TFCI to determine the transmission rate to be used in the PDSCH frame. If the transmission rate to be used in the PDSCH is achievable from the point-of view of the UE, no action is needed. In this situation, the benefit of using the power transition technique in the DL DPCH is the reduction in the effect of bursty errors caused by the high power PDSCH to other services, as the transmit powers used for other services have been adjusted already prior to PDSCH transmission.

If, on the other hand, the transmission rate to be used in the following PDSCH is determined by the UE to be too high, the base station can be informed not to transmit the PDSCH in order not to cause extra burden to the system by introducing unnecessary interference and re-transmission. Alternatively, as mentioned above, the base station can introduce an extra power increase in order to increase the probability of successful transmission.

It will be appreciated that embodiments of the present invention, when applied to a UTRA network, are not limited to use of the UTRA network channels described above. For example, in the final UTRA standard, the PDSCH might be an option rather than a mandatory feature. In that case another downlink channel would be used for transmission in an equivalent way, for example a dedicated channel allocated to the user.

For uplink transmissions, one possibility would be to use the common packet channel for transmission of both the probing (and/or transitional) signals as well as the subsequent data signals. In this case the power control preamble of the common packet channel could be used as probing (and/or transitional) signals. Alternatively, if a dedicated channel is used for data transmission, either a probing (and/or transitional) preamble could be introduced into the channel, or the existing low rate (power) data transmissions could be used for probing (and/or transitional) purposes.

There will now be described one possible method of obtaining a mapping between SIR (or signal to interference and noise ratio SINR) and achievable data rate.

Figure 19:
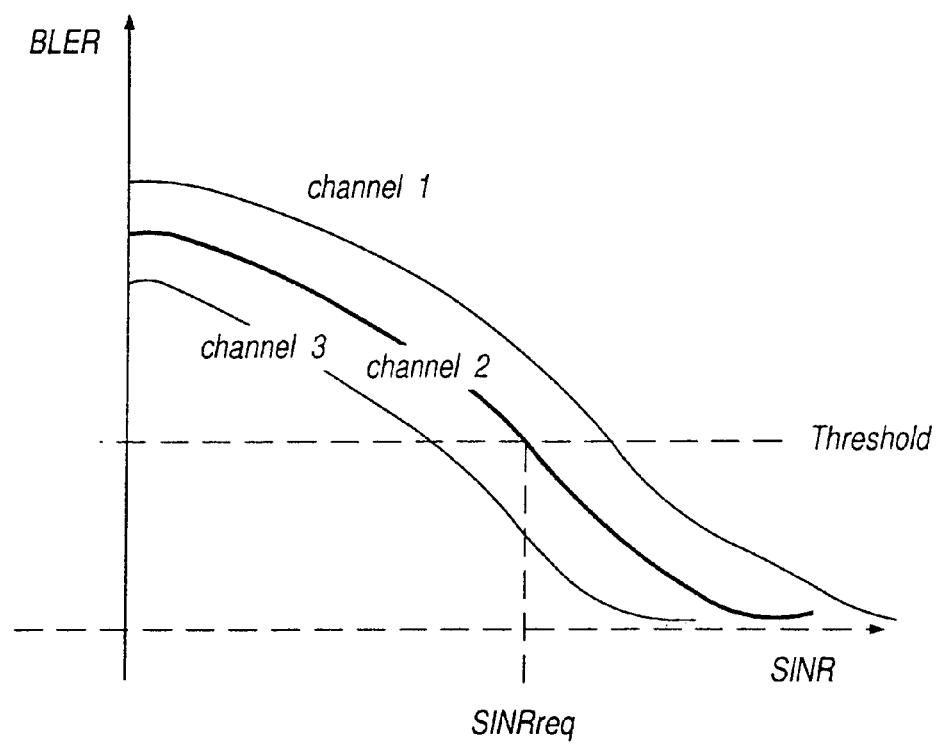
FIG. 19 is a graph showing the variation of block error rate with signal to noise and interference ratio.

Firstly, the mapping between block error rate BLER and SINR per symbol ($SINR_s$) can be predetermined by simulations or experiments and stored in a look-up table. As shown in FIG. 19, this mapping is a function of the radio channel. Before the data transmission, the receiver decides on which particular mapping (curve) fits best with the currently-prevailing operating conditions by doing channel estimation.

Secondly, from the SINR per symbol ($SINR_s$), the receiver can derive the SINR per chip ($SINR_c$) by dividing the SINR per symbol by the spreading factor $SF_o$ which is used for transmitting the transitional or probing signals. $SF_o$ is constant over the transitional or probing period.

Thirdly, from the SINR per chip ($SINR_c$), the receiver can estimate the SINR per symbol ($SINR_{test}$) for different data rates. This can be done by multiplying the $SINR_c$ by different spreading factors $SF_{test}$ corresponding to the different data rates. A greater spreading factor gives a higher $SINR_{test}$ and smaller spreading factor gives lower $SINR_{test}$.

With a given BLER threshold (targeted BLER) and the chosen BLER/SINR mapping curve, the receiver finds the $SINR_{req}$. The smallest spreading factor which ensures that the corresponding SINR is greater than the SINR required to achieve the targeted BLER is chosen as the spreading factor to be used, which subsequently gives the achievable data rate. This can be expressed mathematically as:

$$\min (SF_{test})$$

$$SINR_{test} \geq SINR_{req}$$

This technique can be applied in reverse to determine a target SIR corresponding to a target data rate in step S101 of the FIG. 15(A) flowchart.

Another approach, which is derived from the above, is to have a table which gives the required SINR ($SINR_{req}$) to achieve the targeted BLER for different channels, which will be a one-dimensional array. With the estimated SINR per chip ($SINR_c$), the receiver decides on the smallest spreading factor which is needed to achieve the SINR. This can be expressed mathematically as:

$$SF_{req} = int\left(\frac{SINR_{req}}{SINR_c}\right)$$

which subsequently gives the data rate. In the equation, "int" means to take the nearest spreading factor, noting that only the integers which are powers of 2 can be used as spreading factors.

Although the examples described above relate to a base station transmitting to user equipment, it will be appreciated that the invention is applicable to the case where user equipment is transmitting to the base station.

It will be appreciated that the probing (and/or transitional) signals described above can be extra signals introduced solely for the purpose of probing (and/or performing a smooth power transition), so that such signals are transmitted during a specified probing (and/or transition) period. Alternatively the probing (and/or transitional) signals could be existing signals already being transmitted by the network, for example control signalling or data signalling. For instance, if a rate increase has been requested in an existing low data rate transmission (for example to take advantage of a sudden change in traffic load such as when another high data rate service is finishing), the transmission power of the existing low rate data stream can be ramped up gradually during the transitional period before the rate change in that data stream is effected. In this case, the existing data signals serve as the transitional signals. Probing could also be performed using the existing data signals. The existing or extra signals could even be in the reverse direction to the signal whose rate is to be changed (e.g. when a change in rate of a downlink channel such as FACH is to be made, the transitional signals or probing signals could be sent on an uplink channel such as the CPCH).

The probing (and/or transitional) signals can serve a dual purpose by carrying control information such as transmission format indicators and/or pilots.

By using a method embodying the present invention in which a preamble period is used in which to transmit transitional and/or probing signals prior to a high data rate transmission, the transmitter is able to sense the achievable transmission rate without exceeding the maximum transmission power allowed by the network. The transmitter is therefore able to use the radio resources more effectively, thus increasing channel efficiency. Since the transmitter can use the maximum achievable data rate and also avoid unsuccessful transmission, the throughput will be higher and the system delay will be significantly reduced. A further advantage is the reduction of bursty interference caused by a sudden high power transmission to other existing services, thus resulting in higher system stability. The technique can ensure that a high data rate transmission uses the maximum achievable data rate, or alternatively uses the minimum transmission power, as well as offering a high probability of transmission success, therefore minimising the interference caused by other existing services, thereby reducing system instability.

Although embodiments of the present invention have been described as being applicable to the proposed UTRA W-CDMA network, it will be appreciated that the principle of the invention is more widely applicable to other CDMA systems, such as a CDMA2000 network.

It will also be appreciated that, although the above description has focussed on mobile communications networks, in which communication occurs between a base station and a user equipment, the invention is also applicable to other network architectures. For example an embodiment of the invention can be applied to a network where communications take place directly between terminals (user equipment) in a peer-to-peer fashion. Such terminals may either be mobile or fixed.

The invention claimed is:

1. A communications network comprising first and second stations, said first station comprising a transmitter and the said station comprising a receiver, the network further comprising:
a transition control unit configured, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in accordance with a transition profile including a plurality of incremental steps that define one of linear and non-linear transition over a transmission power change required by said change in transmission rate of that signal, and
a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

2. A communications network as claimed in claim 1, wherein said power levels of said transitional signals are determined based on a predetermined power profile.

3. A communications network as claimed in claim 1, wherein the said change in transmission rate of the said preselected signal is an increase in transmission rate.

4. A communications network as claimed in claim 3, wherein said power levels of the transitional signals are increased gradually over the course of said transitional period.

5. A communications network as claimed in claim 1, wherein said transitional signals are transmitted using the same channel as is used to transmit said preselected signal.

6. A communications network as claimed in claim 1, having respective first and second different channels available for transmission of signals from said first station to said second station, wherein said transitional signals are transmitted using said first channel and said preselected signal is transmitted using said second channel.

7. A communications network as claimed in claim 1, being a mobile communication network, one of the first and second stations being a base station of the mobile communications network and the other of the first and second station being a mobile station of the mobile communications network.

8. A communications network as claimed in claim 1, being a mobile communications network, wherein each of the first and second stations is a user equipment of the mobile communications network.

9. A communications network as claimed in claim 1, wherein said preselected signal carries data in the form of packets.

10. A communications network comprising first and second stations, said first station comprising a transmitter and said second station comprising a receiver, the network further comprising:
a transition control unit configured, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in such a way as to reduce a level of instability in the network that would otherwise result from a transmission power change required by said change in transmission rate of that signal,
wherein said change in transmission rate of said preselected signal is an increase in transmission rate, and wherein said power levels of said transitional signals are increased one after the next in a first phase of the transitional period to reach a maximum value and are then decreased one after the next in a second phase of the transitional period following the first phase.

11. A communications network comprising first and second stations, said first station comprising a transmitter and said second station comprising a receiver, the network further comprising:
a transition control unit configured, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in such a way as to reduce a level of instability in the network that would otherwise result from a transmission power change required by said change in transmission rate of that signal, wherein at least one of said transitional-signal power levels is set in dependence upon an estimate of the power level at which said preselected signal is required to be transmitted when said change is effected.

12. A communications network as claimed in claim 11, wherein the power level of a last one of said transitional signals transmitted in said transitional period is equal to said estimate of required power level.

13. A mobile communications network comprising first and second stations, said first station comprising a transmitter and said second station comprising a receiver, the network further comprising:

a transition control unit configured, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in such a way as to reduce a level of instability in the network that would otherwise result from a transmission power change required by said change in transmission rate of that signal, being a mobile communication network, one of the first and second stations being a base station of the mobile communications network and the other of the first and second station being a mobile station of the mobile communications network, and wherein said first station is a base station of the network, said second station is one user equipment of the network, said first channel is a dedicated channel allocated individually to said one user equipment, and said second channel is a shared channel available for use on shared basis by said one user equipment and by at least one further user equipment of the network.

14. A mobile communications network as claimed in claim 13, wherein said network is a UTRA network, said first channel is a dedicated physical channel and said second channel is a physical downlink shared channel.

15. A base station, for use in a mobile communications network, comprising:

a transition control unit configured, prior to a change in a transmission rate of a preselected signal from the base station to a user equipment of the network, to cause transitional signals to be transmitted from the base station to said user equipment over the course of a transitional period expiring before said change is effected, the power levels of said transitional signals being varied over the course of said period in accordance with a transition profile including a plurality of incremental steps that define one of linear and non-linear transition over a transmission power change required by said change in transmission rate of that signal, and a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

16. A user equipment, for use in a mobile communications network, comprising:

a transition control unit configured, prior to a change in a transmission rate of a preselected signal from the user equipment to a receiving station of the network, to cause transitional signals to be transmitted from the user equipment to said receiving station over the course of a transitional period expiring before said change is effected, the power levels of said transitional signals being varied over the course of said period in accordance with a transition profile including a plurality of incremental steps that define one of linear and non-linear transition over a transmission power change required by said change in transmission rate of that signal, and a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

17. A communications method for use in a communications network comprising first and second stations, said first station comprising a transmitter and the second station comprising a receiver, wherein:

prior to a change in a transmission rate of a preselected signal from said first station to said second station, transitional signals are caused to be transmitted from said first station to said second station over the course of a transitional period expiring before said change is effected, the power levels of said transitional signals being varied over the course of said period in accordance with a transition profile including a plurality of incremental steps that define one of linear and non-linear transition over a transmission power change required by said change in transmission rate of that signal, and a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

18. A communications network comprising first and second stations, said first station comprising a transmitter and said second station comprising a receiver, the network further comprising:

transition control means configured, prior to a change in a transmission rate of a preselected signal from said first station to said second station, to cause transitional signals to be transmitted from said first station to said second station over the course of a transitional period expiring before said change is effected, the power levels of said transitional signals being varied over the course of said period in accordance with a transition profile including a plurality of incremental steps that define one of linear and non-linear transition over a transmission power change required by said change in transmission rate of that signal, and a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

19. A base station, for use in a mobile communications network, comprising:
   transition control means configured, prior to a change in a transmission rate of a preselected signal from the base station to a user equipment of the network, to cause transitional signals to be transmitted from the base station to said user equipment over the course of a transitional period expiring before said change is effected,
   means for varying the power levels of said transitional signals being varied over the course of said signal in accordance with a transition profile including a plurality of incremental steps that define one of linear and non-linear transition over a transmission power change required by said change in transmission rate of that signal, and
   a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

20. A user equipment, for use in a mobile communications network, comprising:
   transition control means configured, prior to a change in a transmission rate of a preselected signal from the user equipment to a receiving station of the network, to cause transitional signals to be transmitted from the user equipment to said receiving station over the course of a transitional period expiring before said change is effected, means for varying the power levels of said transitional signals being varied over the course of said signal in accordance with a transition profile including a plurality of incremental steps that define one of linear and non-linear transition over a transmission power change required by said change in transmission rate of that signal, and a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

21. A communications method for use in a communications network comprising first and second stations, said first station comprising a transmitter and the second station comprising a receiver, said method including the steps of:
   causing prior to a change in a transmission rate of a preselected signal from said first station to said second station, transitional signals to be transmitted from said first station to said second station over the course of a transitional period expiring before said change is effected,
   varying the power levels of said transitional signals over the course of said period in accordance with a transition profile including a plurality of incremental steps that define one of linear and non-linear transition over a transmission power change required by said change in transmission rate of that signal, and
   a condition measuring unit for measuring one or more predetermined characteristics of the prevailing network conditions, wherein said transition control unit is configured to set the said power levels in dependence upon the said measured characteristics, wherein said power levels of said transitional signals are chosen so as to limit a rate of change of the said power levels to below a preselected maximum value.

* * * * *